(12) United States Patent
Ebihara et al.

(10) Patent No.: US 8,950,300 B2
(45) Date of Patent: Feb. 10, 2015

(54) TOOL HOLDER WITH VARIABLE TOOL ROTATION RADIUS, MACHINE TOOL WITH TOOL HOLDER, AND MACHINING METHOD USING MACHINE TOOL

(75) Inventors: Kenzo Ebihara, Yamanashi (JP); Masayuki Hamura, Yamanashi (JP)

(73) Assignee: FANUC Corporation, Yamanashi (JP)

( * ) Notice: Subject to any disclaimer, the term of this patent is extended or adjusted under 35 U.S.C. 154(b) by 425 days.

(21) Appl. No.: 13/098,672

(22) Filed: May 2, 2011

(65) Prior Publication Data

US 2011/0299949 A1   Dec. 8, 2011

(30) Foreign Application Priority Data

Jun. 3, 2010   (JP) ................. 2010-127884

(51) Int. Cl.
| B23B 29/12 | (2006.01) |
| B23B 1/00 | (2006.01) |
| B23B 5/00 | (2006.01) |
| B23B 27/20 | (2006.01) |
| B23B 29/034 | (2006.01) |

(52) U.S. Cl.
CPC . *B23B 29/12* (2013.01); *B23B 1/00* (2013.01); *B23B 5/00* (2013.01); *B23B 27/20* (2013.01); *B23B 29/03489* (2013.01); *B23B 2250/04* (2013.01); *B23B 2270/04* (2013.01)
USPC ................. 82/1.5; 82/1.2

(58) Field of Classification Search
USPC ............... 82/1.2, 1.5; 408/199, 227
See application file for complete search history.

(56) References Cited

U.S. PATENT DOCUMENTS

| 963,596 | A | * | 7/1910 | Lesoure | 408/159 |
| 1,362,529 | A | * | 12/1920 | Ehlers | 408/135 |
| 2,314,084 | A | * | 3/1943 | Fried | 408/147 |
| 2,394,612 | A | * | 2/1946 | Horne, Jr. | 82/1.5 |
| 2,594,671 | A | * | 4/1952 | McTyre et al. | 82/1.5 |
| 2,661,640 | A | * | 12/1953 | Ruegg | 82/1.3 |
| 2,728,138 | A | * | 12/1955 | Guild | 30/92 |
| 2,745,299 | A | * | 5/1956 | Fried et al. | 82/1.2 |
| 3,540,325 | A | * | 11/1970 | Artaud | 408/187 |
| 6,270,295 | B1 | * | 8/2001 | Hyatt et al. | 408/1 R |
| 6,558,087 | B1 |  | 5/2003 | Hollfelder |  |

(Continued)

FOREIGN PATENT DOCUMENTS

| CN | 10130097 | 11/2008 |
| CN | 101523315 | 9/2009 |

(Continued)

OTHER PUBLICATIONS

Decision to Grant mailed Nov. 1, 2011 for JP 2010-127884.

(Continued)

*Primary Examiner* — Andrea Wellington
*Assistant Examiner* — Sara Addisu
(74) *Attorney, Agent, or Firm* — Lowe Hauptman & Ham

(57) ABSTRACT

Since a tool holder is formed of a structure which is elastically deformed by a centrifugal force produced as the tool holder rotates around a rotation center axis, the rotation radius of a tool with a cutting edge directed to the rotation center axis varies from zero to an arbitrary value. The structure of the tool holder includes two beams elastically deformable to the same degree in opposite directions by the centrifugal force, and centrifugal force components acting on the two beams cancel each other so that a rotation balance is maintained even when the rotational speed of the tool holder is changed.

8 Claims, 20 Drawing Sheets

(56) References Cited

U.S. PATENT DOCUMENTS

| | | |
|---|---|---|
| 6,654,176 B2 | 11/2003 | Yoshikawa et al. |
| 6,729,810 B2 * | 5/2004 | Hyatt et al. ............... 408/1 R |
| 2008/0110306 A1 | 5/2008 | Kendig et al. |
| 2009/0047874 A1 | 2/2009 | Toriumi et al. |
| 2010/0232895 A1* | 9/2010 | Heule et al. ............... 408/59 |
| 2011/0052339 A1* | 3/2011 | Burr et al. ............... 408/181 |

FOREIGN PATENT DOCUMENTS

| | | | |
|---|---|---|---|
| EP | 0895836 | | 2/1999 |
| JP | 02185309 A | * | 7/1990 |
| JP | 2110408 B | | 9/1990 |
| JP | 05123914 A | * | 5/1993 |
| JP | 9 309010 A | | 12/1997 |
| JP | 10263910 A | * | 10/1998 |
| JP | 1170495 A | | 3/1999 |
| JP | 2000-052217 A | | 2/2000 |
| JP | 2000263372 A | * | 9/2000 |
| JP | 2002346815 A | | 12/2002 |
| JP | 2003121612 A | | 4/2003 |
| JP | 2003145332 A | * | 5/2003 |
| JP | 2005246500 A | | 9/2005 |
| JP | 2006281358 A | * | 10/2006 |
| JP | 4213897 B2 | | 1/2009 |
| TW | 242595 B | | 3/1995 |
| TW | 500645 B | | 9/2002 |
| TW | M300153 U | | 11/2006 |
| TW | M319097 U | | 9/2007 |

OTHER PUBLICATIONS

Japanese Office Action 2010-127884 issued Aug. 2, 2011.
Office Action for Chinese application No. 201110111865.1 dated Jun. 20, 2013.
Office Action dated Nov. 11, 2013, corresponds to Taiwanese patent application No. 100114804.

\* cited by examiner

STATIONARY STATE OR LOW-SPEED ROTATION MODE

HIGH-SPEED ROTATION MODE

STATIONARY STATE OR LOW-SPEED ROTATION MODE

HIGH-SPEED ROTATION MODE

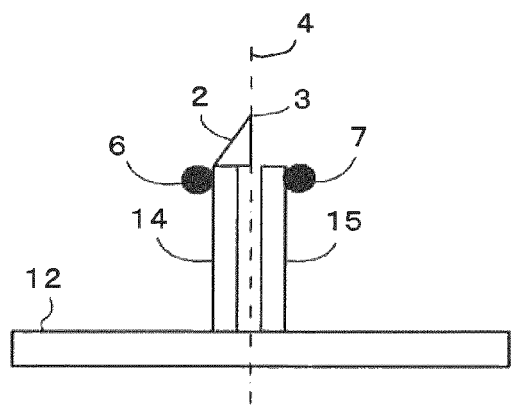
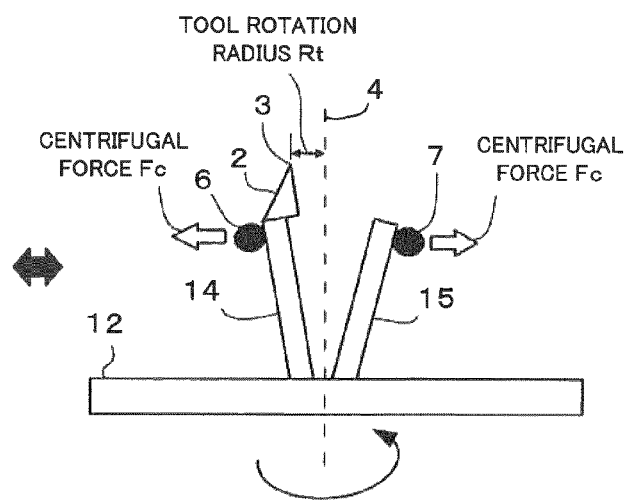
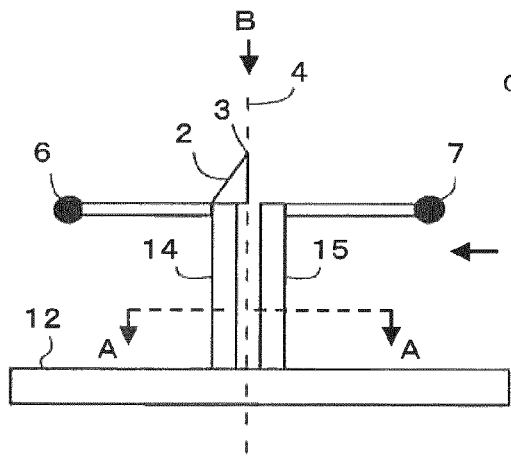
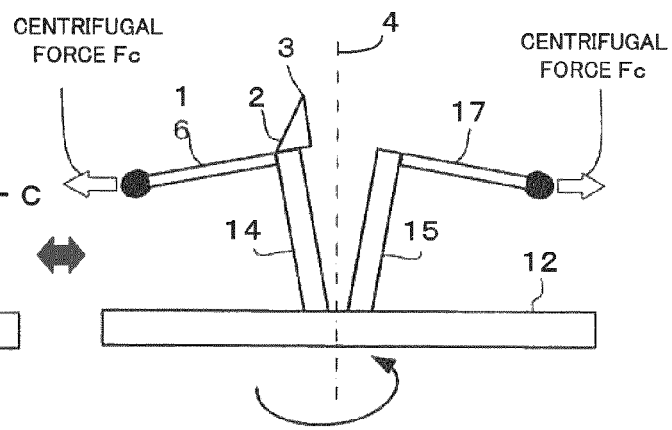

STATIONARY STATE OR LOW-SPEED ROTATION MODE

HIGH-SPEED ROTATION MODE

H-H SECTIONAL VIEW

STATIONARY STATE

TOOL EDGE ON
ROTATION CENTER

MAXIMUM-SPEED
ROTATION MODE

TRAJECTORY OF TOOL AT VARIED
ROTATIONAL SPEED

STATIONARY STATE

TOOL EDGE ON ROTATION CENTER

MAXIMUM-SPEED ROTATION MODE

CONCENTRIC MACHINING MARKS

CENTER OF LENS SHAPE

CENTER OF LENS SHAPE   REMOVE CUTTING RESIDUE BY OSCILLATING TOOL ROTATION CENTER

CENTER OF LENS SHAPE   REDUCE SHAPE ERROR AT CENTRAL PORTION BY CHANGING TOOL POSTURE

MACHINING OF FREE CURVED SURFACE WITH VARIED TOOL ROTATION RADIUS

MACHINING OF FREE CURVED SURFACE BY CONVENTIONAL END MILL

FIG.26A
FIG.26B
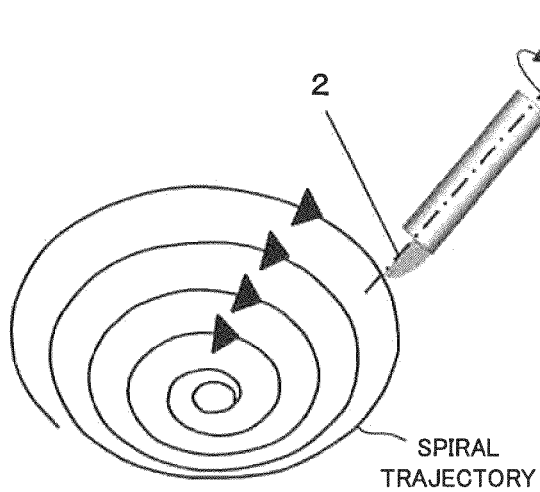
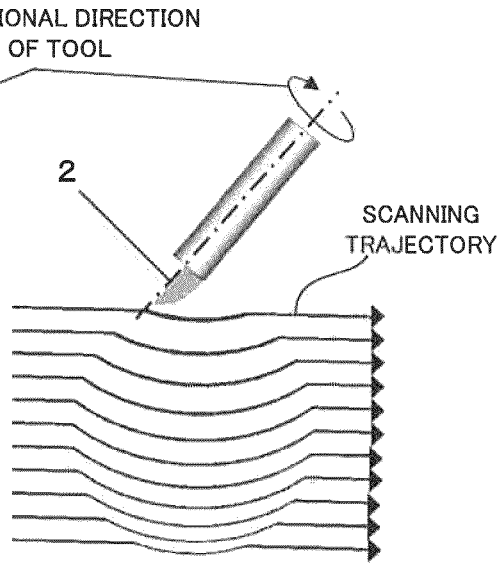
FIG.27A
FIG.27B
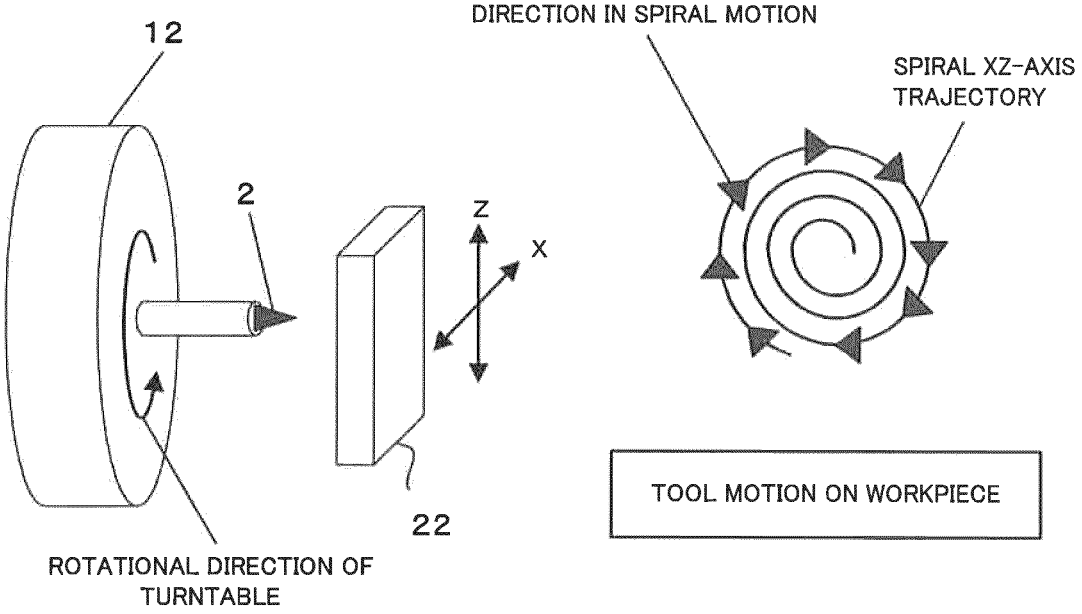

SIDE SECTIONAL VIEW

FRONT SECTIONAL VIEW

TOOL HOLDER WITH VARIABLE TOOL ROTATION RADIUS, MACHINE TOOL WITH TOOL HOLDER, AND MACHINING METHOD USING MACHINE TOOL

RELATED APPLICATIONS

The present application is based on, and claims priority from Japanese Application Number 2010-127884, filed Jun. 3, 2010, the disclosure of which is hereby incorporated by reference herein in its entirety.

BACKGROUND OF THE INVENTION

1. Field of the Invention

The present invention relates to a tool holder with a variable tool rotation radius, a machine tool provided with the tool holder, and a machining method using the machine tool.

2. Description of the Related Art

A high-precision mold is used to mass-produce lenses for optical components. Since conventional lenses have a rotationally symmetrical shape, ultra-precision lathe turning using a single-crystal diamond tool is applied to the manufacture of molds. In conventional lathe turning, a workpiece mounted on a spindle is rotated at high speed, and a tool is pressed against the workpiece to cut an arbitrary rotationally symmetrical shape. Thus, there is only one center of rotation on the workpiece.

Recently, however, there has been an increasing demand for lens-array molds (see FIGS. 19A to 20B) each configured so that tens to thousands of lenses with a diameter of several millimeters are arranged side by side. In order to machine a lens-array mold by lathe turning, the rotation center of each lens shape needs to be aligned with the spindle of a lathe.

Since it is difficult to manually adjust a machining position for a lens with precision, a two-axis linear-motion table, for example, is mounted on the spindle so as to be perpendicular to a rotation center axis. The center of rotation on a workpiece can be arbitrarily changed if the workpiece is mounted on the table.

However, a drive cable cannot be connected to the rapidly rotating spindle, and in addition, it is technically difficult to provide the table with a sufficient retention to resist centrifugal force produced during spindle rotation. Alternatively, a large number of lens molds may be separately fabricated using a lathe and combined together into a lens-array mold. In many applications of lens arrays, however, distances between individual lenses are exactly designed, so that it is difficult to assemble thousands of molds with exact distances between the lenses.

Accordingly, there is an eager demand for a high-speed, high-precision machining method for lens arrays other than lathe turning. Milling is generally known as a machining method for lens-array shapes. In this method, a small-diameter rotary tool is mounted on a spindle, and a lens shape is machined by simultaneously driving three orthogonal axes of a machine tool to depict a spiral trajectory.

In machining a complicated free curved surface by conventional milling, as shown in FIG. 25, a small-diameter end mill is used to deal with a small-radius concave portion, if any, in a shape to be machined. Since the small-diameter tool can cut little while it is making one revolution, however, its machining efficiency for a gently sloping surface is very poor. In some ultra-precision machining, in particular, the tool position is not allowed to be shifted even by only 1 μm by tool replacement. In finish machining, therefore, tool replacement is prohibited, so that the entire surface to be machined is bound to be machined by a single tool, in many cases.

FIGS. 26A and 26B are views illustrating lens-array machining by conventional milling. FIG. 26A shows a method in which a cutting tool is rotated by a spindle as a spiral trajectory for machining is depicted by linear axes of a machine tool. FIG. 26B shows a method in which the tool is moved for machining in a scanning manner by the linear axes. In either method, acceleration and deceleration of each axis become sharp if the machining speed is increased, and the machining speed is determined depending on the acceleration performance of the linear axes. Since the tool depicts the trajectories shown in FIGS. 26A and 26B while rotating at high speed, moreover, actual cutting distances of the tool are much longer than the trajectories, and the tool is significantly worn.

As described above, a drawback of this machining method lies in that if the machining speed is increased, a fast spiral motion is performed within a lens diameter as small as several millimeters, so that the linear axes frequently change their courses. In machining near the center of a lens, in particular, high-speed switching between acceleration and deceleration is required, so that the machining speed is greatly affected by the acceleration performance of the linear axes. In milling, moreover, the tool is rotated at high speed, so that it is worn more significantly than in lathe turning. Thus, it is difficult to machine thousands of lens shapes without tool replacement.

As a method for suppressing tool wear, there is proposed a method in which the tool angle is changed by a turntable as a spiral motion is made by three orthogonal axes. FIGS. 27A and 27B illustrate another prior art machining method in which the angle of a tool 2 is changed as a spiral trajectory is depicted for lens-array machining. In this machining method, the motion of the tool 2 is similar to that in the case of lathe turning, so that tool wear can be effectively suppressed. Like the methods shown in FIGS. 26A and 26B, however, this method has a drawback that high-speed machining requires sharp acceleration and deceleration of linear axes that make a spiral motion.

Japanese Patent Application Laid-Open Nos. 2003-121612 and 2000-52217 disclose machining methods in which both tool wear and high-speed drive of linear axes are suppressed.

FIGS. 28A and 28N are views illustrating another prior art machining method (Japanese Patent Application Laid-Open No. 2003-121612) in which a workpiece is machined by a tool shaped after the cross-sectional shape of a lens. According to this method, a tool 2 for machining the workpiece is finely moved up and down by means of a piezoelectric element. This method has drawbacks that it is not applicable to convex shapes and that it, in principle, cannot be used to machine rotationally symmetrical shapes, if concave.

FIG. 29 is a view illustrating a prior art technique (Japanese Patent Application No. 2000-52217) in which a workpiece is machined by a tool shaped after the cross-sectional shape of a lens. This technique is applicable to rotationally symmetrical shapes and convex shapes. This technique, however, is not suitable for high-precision lens shape machining, since it is very difficult to mold a tool 2 rotatable around a rotation center axis 4 to a contour precision of micron order or less.

Any of the prior art techniques disclosed in the above-described patent documents is not applicable to the manufacture of high-precision lens molds, since it requires a special tool shaped after the cross-sectional shape of a lens, its shaping precision depends on the tool precision, and it cannot correct shape errors.

SUMMARY OF THE INVENTION

In view of the machining speed and machining precision, lathe turning can be regarded as an ideal lens shape machining method. Also in lens-array shape machining, motions of a tool and each axis of a machine tool are expected to be similar to those in lathe turning.

Accordingly, the object of the present invention is to provide a tool holder with a variable tool rotation radius, configured so that motions of a tool and each axis of a machine tool are similar to those in lathe turning, the machine tool provided with the tool holder, and a machining method using the machine tool.

A tool holder according to the present invention for securing a tool comprises a structure which is elastically deformed by a centrifugal force produced as the tool holder rotates around a rotation center axis, the rotation radius of the tool with a cutting edge directed to the rotation center axis varying from zero to an arbitrary value. According to this tool holder, a tool rotation radius can be changed according to the rotational speed of a spindle.

The structure of the tool holder may comprise two beams elastically deformable to the same degree in opposite directions by the centrifugal force, and centrifugal force components acting on the two beams may be configured to cancel each other so that a rotation balance is maintained even when the rotational speed of the tool holder is changed. According to this tool holder, the rotation balance can always be maintained despite the change of the tool rotation radius, so that vibration synchronous with unbalanced rotation can be prevented.

The two beams of the tool holder may be connected individually to two balance weights in positions with rotation radii larger than that of the tool holder, and elastic deformation of the tool holder may be increased by means of the centrifugal force acting on the balance weights during rotation. The balance weights in the positions with the larger rotation radii connected to the beams of this tool holder can make the tool rotation radius larger by applying a great centrifugal force to the beams.

One of the two beams of the tool holder may be configured to be fitted with the tool, and the structure of the tool holder may be configured to be fitted with a balance weight for adjusting the rotation balance of the entire tool holder, including a change produced by the mass of the mounted tool. Unbalanced rotation can be prevented by overcoming the change of the mass caused by the tool mounted on the tool holder.

The structure of the tool holder may comprise two beams elastically deformable in opposite directions by the centrifugal force, each of the beams being in the form of a parallel spring such that an angle of an end face of the beam is kept constant with respect to the axis of rotation when the beam is elastically deformed by the centrifugal force. This parallel spring can prevent the tool angle (or posture) from changing despite the change of the tool rotation radius.

The cutting edge of the tool, in a coordinate system in which the tool holder is viewed along the rotation center axis, may be configured to be located in a first position deviated from the rotation center axis by an initial offset in a stationary state and located in a second position when the rotational speed is maximum, and the rotation center may be located on a segment which connects the first and second positions. According to this tool holder, the offset ensures a certain machining speed even with a small tool rotation radius. If the tool edge in the stationary state is located on the rotation center, the machining speed (speed of a workpiece relative to the tool) at the central portion becomes extremely low, so that machining cannot be actually performed. Thus, the tool edge is configured to be located on the rotation center with a predetermined rotational speed, whereby the machining speed can be secured.

Further, a machine tool according to the present invention comprises the tool holder of the invention mounted on a spindle, wherein an axial direction of the spindle is coincident with a gravitational direction, and the machine tool comprises an axis movable as a linear axis in at least the axial direction of the spindle, and wherein an arbitrary rotationally symmetrical shape is cut by controlling the rotational speed of the spindle and the position of the linear axis. According to this machine tool, the depth of cut can be changed with an arbitrary radius by controlling the depth of cut with the linear axis movable in the rotational direction of the spindle and controlling the tool rotation radius with the rotational speed of the spindle. If the spindle extends in the gravitational direction, the rotational phase keeps displacement of each beam of the tool holder from being affected by the force of gravity. Thus, the machine tool can precisely cut the arbitrary rotationally symmetrical shape.

Furthermore, in a machining method according to the present invention, which uses the machine tool of the invention, the tool rotation radius with respect to the rotational speed of the spindle and a displacement of the tool along the axis of rotation with respect to the rotational speed of the spindle are previously measured, the radius of a rotationally symmetrical shape to be machined by the machine tool is converted into the rotational speed of the spindle according to point group data for the radius and height or a shape formula, the height is converted into a displacement of the linear axis corrected by the displacement along the axis, and a machining program is then created. According to this machining method, precise machining can be achieved by previously measuring the tool rotation radius with respect to the rotational speed of the spindle and a displacement of the tool edge and reflecting the resulting measured value in the process of converting the shape to be machined into the machining program.

Further, in a machining method for a lens-array shape according to the present invention, a number of rotationally symmetrical shapes are machined in arbitrary positions on a flat or curved surface of a workpiece to be machined by controlling the position and posture of the tool holder by means of the linear axis or rotary axis of the machine tool by the above-described machining method of the invention. According to this machining method for the lens-array shape, a flat array shape formed of a number of rotationally symmetrical shapes can be machined if the machine tool is furnished with three linear axes. If the machine tool is further furnished with two rotary axes, the array shape formed of a number of rotationally symmetrical shapes can be machined on an arbitrary free curved surface by five-axis machining. Thus, arbitrary lens-array shapes can be machined quickly and precisely by a conventional machine tool.

According to the present invention, there may be provided a tool holder with a variable tool rotation radius, configured so that motions of a tool and each axis of a machine tool are similar to those in lathe turning, the machine tool provided with the tool holder, and a machining method using the machine tool.

BRIEF DESCRIPTION OF THE DRAWINGS

The above and other objects and features of the present invention will be obvious from the ensuing description of embodiments with reference to the accompanying drawings, in which:

FIGS. 3A and 3B are views illustrating one embodiment of a tool holder of the invention, having two beams symmetrical with respect to a rotation center axis;

FIGS. 4A and 4B are views illustrating one embodiment of a tool holder of the invention, having two beams and two arms;

FIGS. 26A and 26B are views illustrating lens-array machining by conventional milling;

FIGS. 27A and 27B illustrate a lens-array machining method in which the angle of a tool is changed as a spiral trajectory is depicted for machining;

DETAILED DESCRIPTION OF THE PREFERRED EMBODIMENTS

Figure 1A:
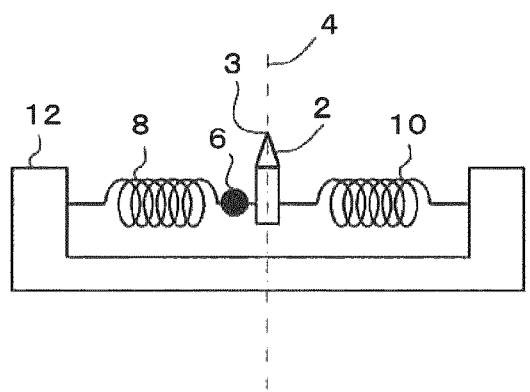
FIGS. 1A and 1B are views illustrating one embodiment of a tool holder of the present invention, having springs.
Figure 1B:
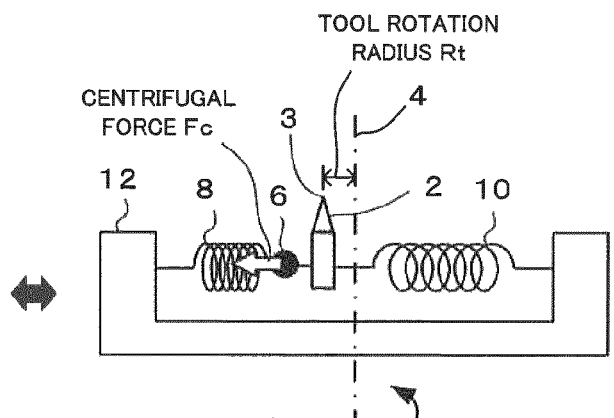

FIGS. 1A and 1B are views illustrating one embodiment of a tool holder with springs. FIG. 1A shows a turntable 12 in a stationary state or low-speed rotation mode, and FIG. 1B shows the turntable 12 in a high-speed rotation mode.

Respective one ends of a first spring 8 and a second spring 10 are secured to a tool 2, and the other ends are secured to the turntable 12. A balance weight 6 is secured to the first spring 8 and located between the first spring 8 and the tool 2. In FIG. 1A, numeral 3 denotes a tool edge.

As shown in FIG. 1A, the turntable 12 is mounted by means of the first and second springs 8 and 10 so as to be coaxial with a rotation center axis 4 with the tool in its stationary state. The first and second springs 8 and 10 are located symmetrically with respect to the rotation center axis 4.

If the turntable 12 is rotated around the rotation center axis 4, a centrifugal force $F_c$ corresponding to the rotational speed of the turntable 12 acts on the balance weight 6, as shown in FIG. 1B. Since the balance weight 6 causes the first and second springs 8 and 10 to contract and extend, respectively, by means of the centrifugal force $F_c$, it is outwardly displaced at right angles to the rotation center axis 4, By this outward displacement of the balance weight 6, the tool 2 is displaced from the rotation center axis 4 and rotates with a tool rotation radius $R_t$ around the axis 4.

Figure 2A:
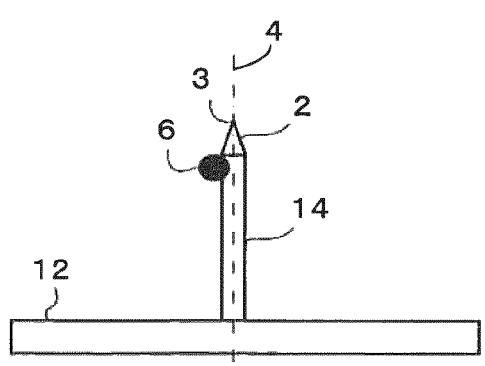
FIGS. 2A and 2B are views illustrating one embodiment of a tool holder of the invention, having a beam.
Figure 2B:
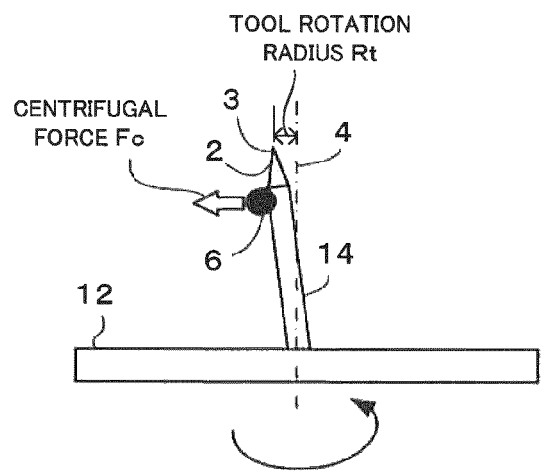

FIGS. 2A and 2B are views illustrating one embodiment of a tool holder with a beam. FIG. 2A shows a turntable 12 in a stationary state or low-speed rotation mode, and FIG. 26 shows the turntable 12 in a high-speed rotation mode.

In this embodiment, a tool 2 is mounted on the turntable 12 by means of a first beam 14 with some rigidity. The first beam 14 has its one end secured to the turntable 12 so that its axis overlaps a rotation center axis 4. The one end of the rotation center axis 4 is secured to the turntable 12 by, for example, welding, a bolt, or screwing.

The tool 2 is secured to the other end of the first beam 14. Further, a first balance weight 6 is secured to the other end side portion of the first beam 14. When the turntable 12 is in the stationary state, the first balance weight 6 is secured to the first beam 14 in a position off the rotation center axis 4. If the turntable 12 is rotated in the manner shown in FIG. 2B, the centrifugal force $F_c$ acts on the first balance weight 6. By the centrifugal force $F_c$ acting on the first balance weight 6, the other end of the first beam 14 to which the tool 2 is secured is shifted outward from the tool rotation center axis. Thereupon, the tool 2 rotates with the tool rotation radius $R_c$ around the axis 4.

FIGS. 3A and 3B are views illustrating one embodiment of a tool holder with two beams located symmetrical with respect to a rotation center axis. FIG. 3A shows a turntable 12 in a stationary state or low-speed rotation mode, and FIG. 3B shows the turntable 12 in a high-speed rotation mode.

The embodiment shown in FIGS. 3A and 3B uses two such we beams as shown in FIGS. 2A and 2B. In order to prevent unbalanced rotation of the turntable 12, the first beam 14 to which the first balance weight 6 is secured and a second beam 15 to which a second balance weight 7 is secured are secured to the turntable 12 so as to be located symmetrically with respect to the rotation center axis 4, as shown in FIG. 3A.

In this embodiment, centrifugal forces $F_c$ act on the two beams 14 and 15 in opposite directions as the turntable 12 rotates, so that they are canceled, If the first and second beams 14 and 15 have the same rigidity and if their respective balance weights (first and second balance weights 6 and 7) are adjusted to the same mass, the beams 14 and 15 are deformed to the same degree, so that the position of the center of gravity cannot be moved by the rotation of the turntable 12. Thus, the rotation of the turntable 12 cannot be unbalanced even in the high-speed rotation mode.

In this embodiment, moreover, the two beams 14 and 15 are not located on the rotation center axis 4 of the turntable 12, so that they are brought down in a fixed direction, and therefore, the balance weights 6 and 7 are not essential. The mass of a tool 2 secured to the first beam 14 may be canceled by differentiating the respective masses or mounting positions of the first and second balance weights 6 and 7. In order to completely avoid unbalanced rotation, the two beams 14 and 15 need to be adjusted so that they are exactly equal in rigidity, mass, and center of gravity with respect to the rotation center axis.

FIGS. 4A and 4B are views illustrating one embodiment of a tool holder with two beams and two arms. FIG. 4A shows a turntable 12 in a stationary, state or low-speed rotation mode, and FIG. 4B shows the turntable 12 in a high-speed rotation mode.

The less rigid first and second beams 14 and 15, the more easily the change of the tool rotation radius with respect to the rotational speed can be increased. If the beams 14 and 15 are less rigid, however, a tool 2 is oscillated more easily, and precision machining cannot be achieved. In order to reconcile the rigidity of the beams 14 and 15 with the tool rotation radius $R_t$, the centrifugal force $F_c$ to elastically deform the first and second beams 14 and 15 should only be sufficiently increased after the rigidity of the beams 14 and 15 is increased. The centrifugal force $F_c$ is proportional to the rotation radius. Even though the rotational speed of the turntable 12 and the mass of each of balance weight are fixed, therefore, a greater centrifugal force $F_c$ can be obtained by locating the mounting positions of the balance weights as far from a rotation center axis 4 as possible.

In order to balance the rotation of the tool holder, the two beams 14 and 15 and two balance weights 6 and 7 connected thereto should preferably be symmetrical with respect to the rotation center axis 4. The larger the rotation radius, the higher the peripheral speed is. Therefore, the balance weights 6 and 7 are susceptible to air resistance. Thus, the balance weights 6 and 7 should be shaped so that they cannot be easily subjected to air resistance.

FIG. 4A illustrates an example in which a first arm 16 and a second arm 17 are provided in order that the balance weights 6 and 7 are rotated in positions as far from the rotation center axis 4 as possible. The first and second beams 14 and 15, like those of the embodiment shown in FIGS. 3A and 3B, are secured to the turntable 12.

In the present embodiment, respective one ends of the first and second beams 14 and 15 are secured to the turntable 12, whereas respective one ends of the first and second arms 16 and 17 are mounted individually on the respective other ends of the first and second beams 14 and 15. The first and second balance weights 6 and 7 are mounted on the other ends of the first and second arms 16 and 17, respectively. Although the tool 2 is mounted on the first beam 14 in the example shown in FIG. 4A, it may alternatively be mounted on the second beam 15.

FIG. 4B shows the turntable 12 rotating at a certain high speed. In this embodiment, the first and second arms 16 and 17 are used to keep the balance weights 6 and 7 as far from the rotation center axis 4 as possible. In this way, a greater centrifugal, force $F_c$ can be obtained than by the use of the fixed rotational speed and balance weight mass.

Figure 5:
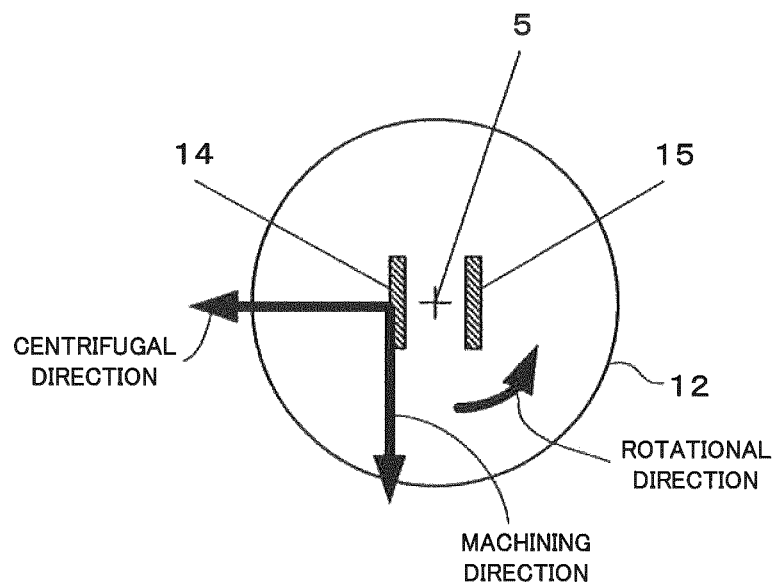
FIG. 5 is a view illustrating a configuration of a tool holder with two beams that are particularly rigid in a machining direction and easily displaceable in a centrifugal direction.

FIG. 5 is a sectional view taken along line A-A of FIG. 4A and illustrating a configuration of a tool holder with two beams that are particularly rigid in the machining direction and easily displaceable in the centrifugal direction.

In order to be particularly rigid in the machining direction and easily displaceable in the centrifugal direction, a first beam 14 and a second beam 15 should preferably have a cross-sectional shape that is thinner in the centrifugal direction. The less rigid the first and second beams 14 and 15, however, the more easily a tool 2 is oscillated, so that precision machining cannot be achieved. Therefore the rigidity in the centrifugal direction is also an essential factor, as mentioned before. When the turntable 12 rotates in the direction shown in FIG. 5 around a rotation center 5 (coincident with the rotation center axis 4), the centrifugal direction and the machining direction are as illustrated in FIG. 5. When the turntable 12 rotates reversely, the machining direction is also reverse.

Figure 6:
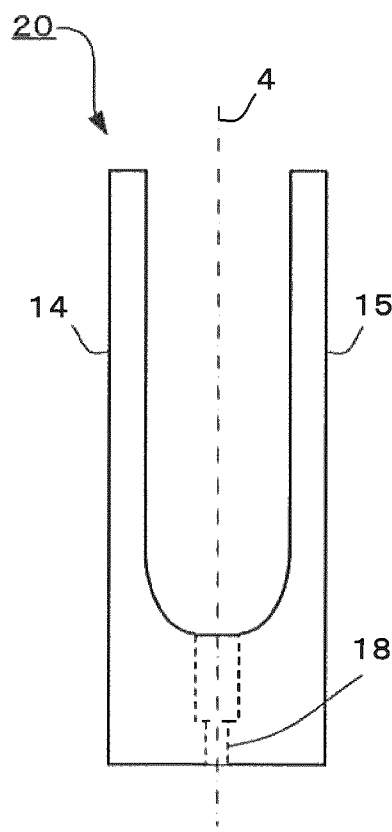
FIG. 6 is a view illustrating one embodiment of a tool holder of the invention, having two beams in an integral U-shaped structure.

FIG. 6 is a view illustrating one embodiment of a tool holder with two beams in an integral U-shaped structure, in which a first beam 14 and a second beam 15 are connected by a bottom fixing portion, whereby undue stress is prevented from acting on their mounting portion. The first and second beams 14 and 15 are repeatedly elastically deformed by a great centrifugal force, so that especially great stress is applied to the bottom fixing portion. The tool holder 20 shown in FIG. 6 is provided with a mounting bolt hole 18 at the bottom fixing portion. The tool holder 20 is secured to the turntable 12 with a bolt (not shown) passed through the mounting bolt hole 18.

Figure 7A:
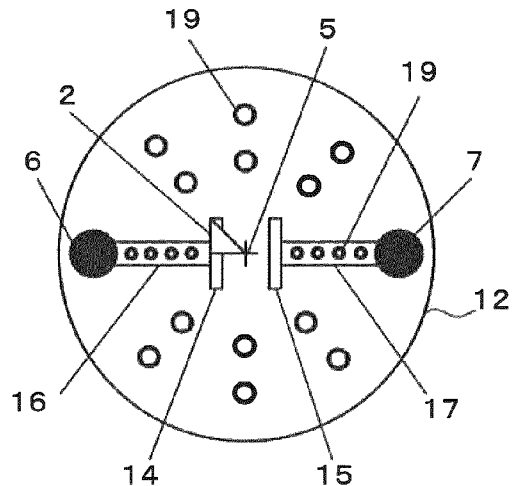
FIGS. 7A and 7B are views illustrating a configuration for adjusting a rotation balance.
Figure 7B:
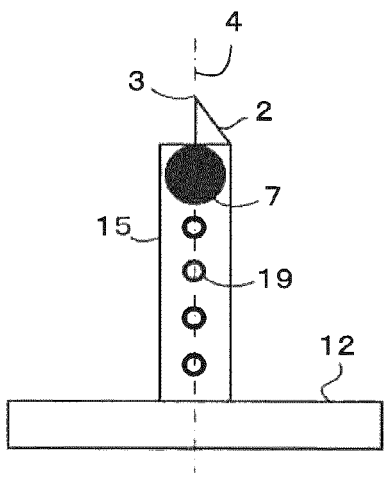

FIGS. 7A and 7B illustrate a configuration for adjusting the rotation balance. FIG. 7A is a view of the tool holder of FIG. 4A taken in the direction of arrow B, and FIG. 7B is a view of the same tool holder taken in the direction of arrow C.

Setscrews with masses adjusted based on their material or length are driven individually into threaded holes at various parts of the tool holder 20, whereby the rotation balance is adjusted. A commercially available dynamic balance measuring device can be used to measure the rotation balance. In a conventional rotation balance adjustment, although the balance does not substantially change by rotational speed, some portions of this tool holder may be deformed depending on the rotational speed. In consideration of this, the state of balance needs to be checked throughout the available range of rotational frequency. If the balance changes depending on the rotational speed, threaded holes at those portions which are displaceable by centrifugal force are used for balance adjustment. Once the tool holder 20 is adjusted for balance, the same balance is reproduced unless it is disengaged. In replacing the tool 2 with one having a substantially different shape and mass, the balance is checked and adjusted on each occasion.

Figure 8A:
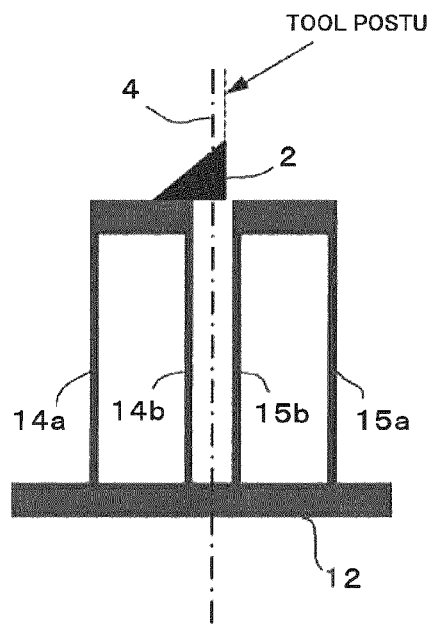
FIGS. 8A and 8B are views illustrating one embodiment of a tool holder, having two leaf spring sets in which two parallel plate-like beams are connected to each other.
Figure 8B:
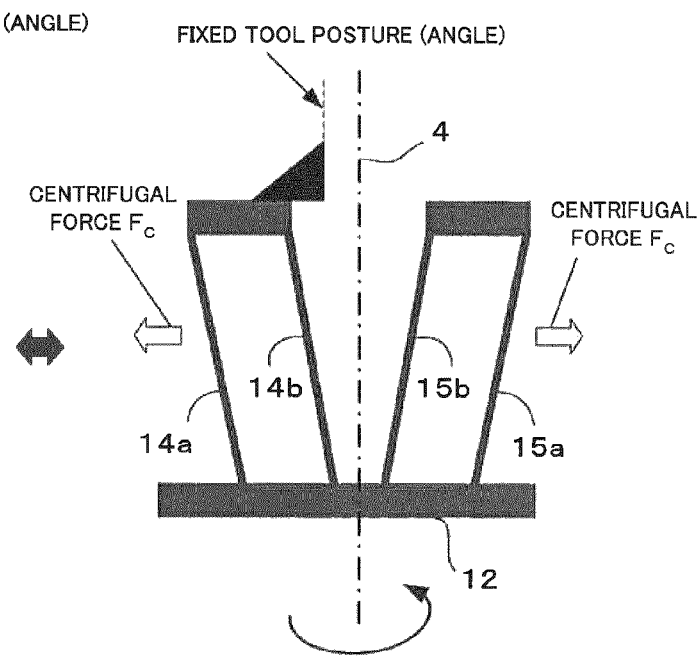

FIGS. 8A and 8B are views illustrating one embodiment of a tool holder with two leaf spring sets in which two parallel plate-like beams are connected to each other.

In the case where a tool holder 20 comprises two simple beams, if the tool rotation radius $R_r$ changes, the beam angle changes, so that the angle of the tool 2 chances correspondingly (see FIG. 11), Some types of machining do not allow such an angle change (or posture change) of the tool.

In order to solve this problem, the two parallel plate-like beams are connected to each other to form the two leaf spring sets, as shown in FIGS. 8A and 8B. In this parallel spring structure, the mounted tool does not undergo an angle change (or posture change) even though the beams are deformed by centrifugal force. Since the tool edge is displaced in the manner shown in FIGS. 15 and 16, only the posture change of the parallel spring structure is suppressed.

Figure 9A:
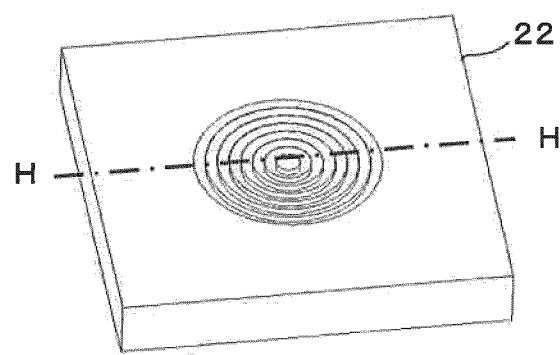
FIGS. 9A and 9B are views illustrating how grooves of a fixed cross-sectional shape can be easily machined in an application such that concentric grooves are formed if the tool angle (or posture) is fixed.
Figure 9B:
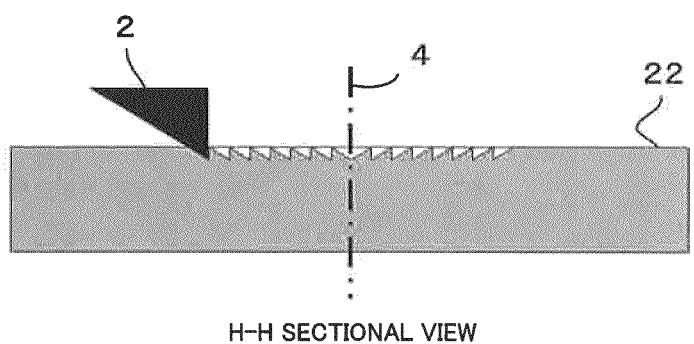

FIGS. 9A and 9B are views illustrating bow grooves of a fixed cross-sectional shape can be easily machined in an application such that concentric grooves are formed if the tool angle (or posture) is fixed. The tool posture may be corrected by adjusting a rotary axis or axes on the machine tool side. The larger the number of axes that require simultaneous control, however, the more the positioning errors of the tool edge are. Therefore, the structure that maintains the tool posture in the manner shown in FIGS. 8A and 8B can ensure machining of higher precision.

Figure 10A:
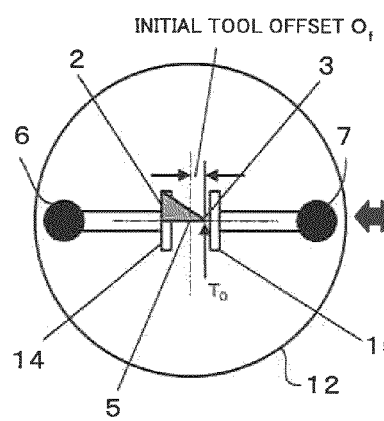
FIGS. 10A to 10C are top views of a tool holder having two beams and two arms in a stationary state and a rotating state.
Figure 10B:
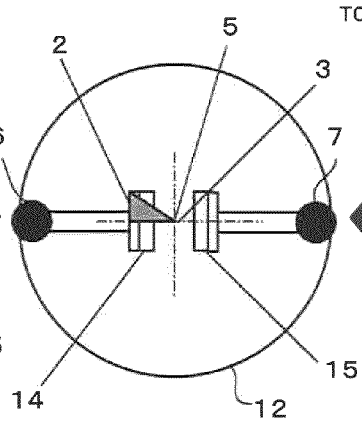
Figure 10C:
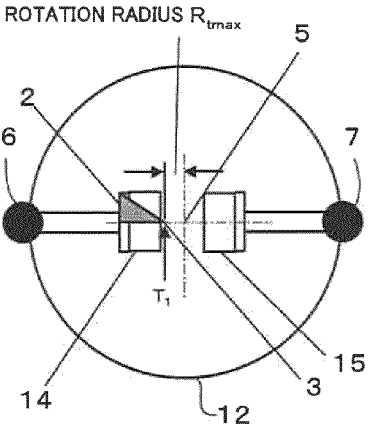

FIGS. 10A to 10C are top views of a tool holder with two beams and two arms in a stationary state or a rotating state. If the cutting edge of a tool 2 is aligned with a rotation center axis 4 when rotation of a turntable 12 around a rotation center 5 is stopped, as shown in FIG. 4A or 7A, the rotational speed and machining speed are reduced so that the machining efficiency is poor when a region near the center of a rotationally symmetrical shape, such as a lens shape, is machined.

If machining conditions of a conventional lathe for machining a lens shape are ideal, machining is performed with a constant rotational speed even at a region near the center. In order to bring conditions for machining with the tool 2 rotated by this tool holder 20 close to the machining conditions of the lathe, the tool rotation radius $R_r$ needs to be reduced to zero without failing to maintain a certain rotational speed.

Figure 10D:
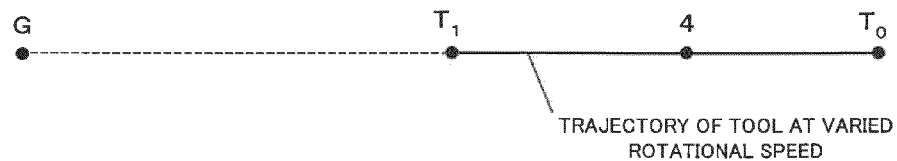

FIG. 10D shows a coordinate system as viewed from the tool holder 20 (taken in the direction of arrow B of FIG. 4), showing a transition from the stationary state to a maximum-speed rotation mode with an initial offset applied to the tool 2. In the stationary state, the cutting edge of the tool 2 is located in a position. $T_0$ deviated from the rotation center axis 4 by the initial offset. If the turntable 12 is rotated in this state, centrifugal force acts on the first and second balance weights 6 and 7 and the like, whereupon the tool edge position is displaced. Let it be assumed that the tool edge position in the maximum-speed rotation mode is $T_1$. Thereupon, a trajectory of the tool edge during the rotational speed change is given by a straight line that connects $T_0$ and $T_1$.

In order to realize the moment when the tool rotation radius R is zero when the rotational speed is changed, the rotation center 5 needs to be located on the straight line that connects $T_0$ and $T_1$. To attain this, moreover, it is important to consider the positional relationship between a beam 14 on the side of the tool 2 and a gravity center position G of the structure including the balance weight 6, and the centrifugal force acts from the rotation center 5 toward the gravity center position G. Actually, the direction in which the tool edge moves depends on the direction in which the beam is easily displaced, as shown in FIG. 5. Basically, however, the beam is displaced in the direction of the centrifugal force. It is essential, therefore, to precisely mount the tool 2 so that $T_0$ (tool edge position with the turntable stationary) is located on an extension of a line extending from the point G to the rotation center. However, it is actually difficult to precisely adjust the position of the tool edge, so that there is a method in which the deviation is corrected during a machining operation (see FIGS. 21, 22, 23A and 23B).

Thus, the initial offset applied to the tool edge position ensures a certain rotational speed when the tool edge is on the rotation center 5, so that the lathe machining conditions can be approximated. In FIG. 10C, a maximum tool rotation radius is shown to be obtained at a maximum rotational speed. If the initial offset is increased, however, the maximum tool rotation radius can be naturally obtained in a nearly stationary state (i.e., before the maximum rotational speed is reached).

Figure 11A:
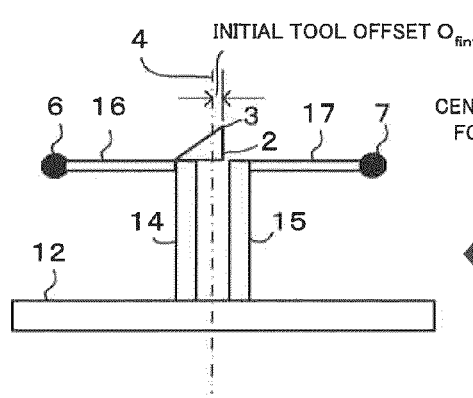
FIGS. 11A to 11C are side views of the tool holder having two beams and two arms in the stationary state and the rotating state.
Figure 11B:
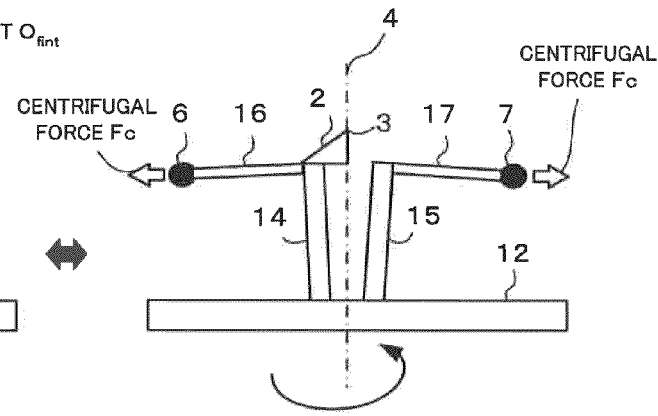
Figure 11C:
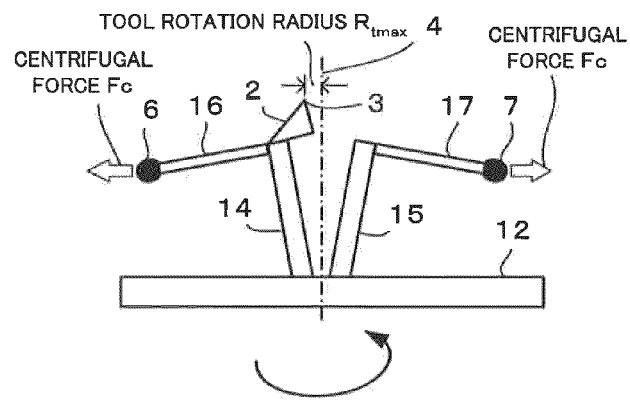

FIGS. 11A to 11C are side views (corresponding to FIGS. 4A and 4B) of the tool holder with two beams and two arms shown in FIG. 10. FIG. 11A shows the tool holder in the stationary state, and FIGS. 11B and 11C shows the tool holder in the rotating state. Respective one ends of two beams 14 and 15 are secured to the turntable 12, and the balance weights 6 and 7 are mounted on the other ends. Thus, the beams 14 and 15 are arranged so that the trajectory of the tool edge position based on the rotational speed is given by a curve, as shown in FIG. 12.

Figure 12:
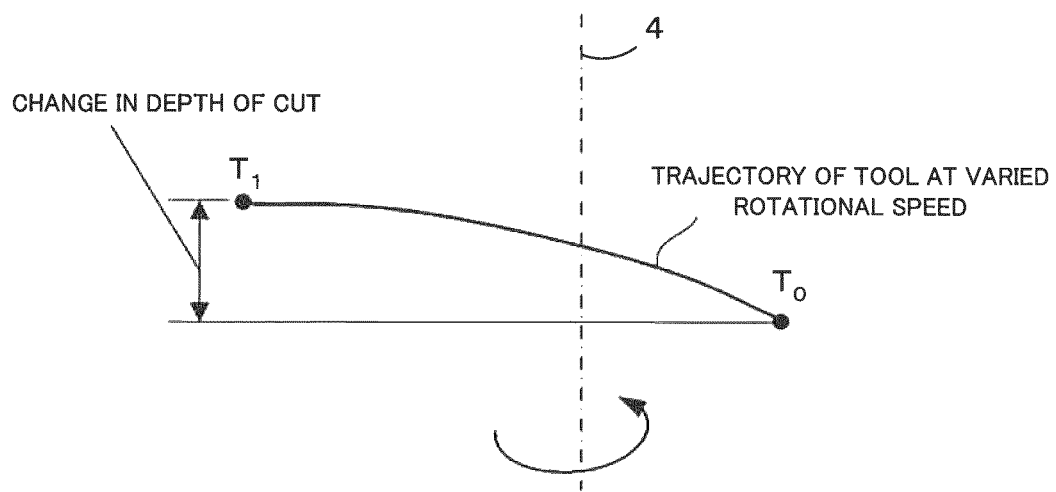
FIG. 12 is a diagram illustrating a trajectory of a tool obtained with the rotational speed of a turntable varied.

In the lens shape machining, the cut direction is coincident with the direction of the rotation center axis, so that the curve of FIG. 12 indicates that the depth of cut of the tool changes according to the rotational speed. As described later (with reference to FIG. 16), therefore, a correction needs to be made in consideration of the depth of cut to ensure precise machining.

Figure 13A:
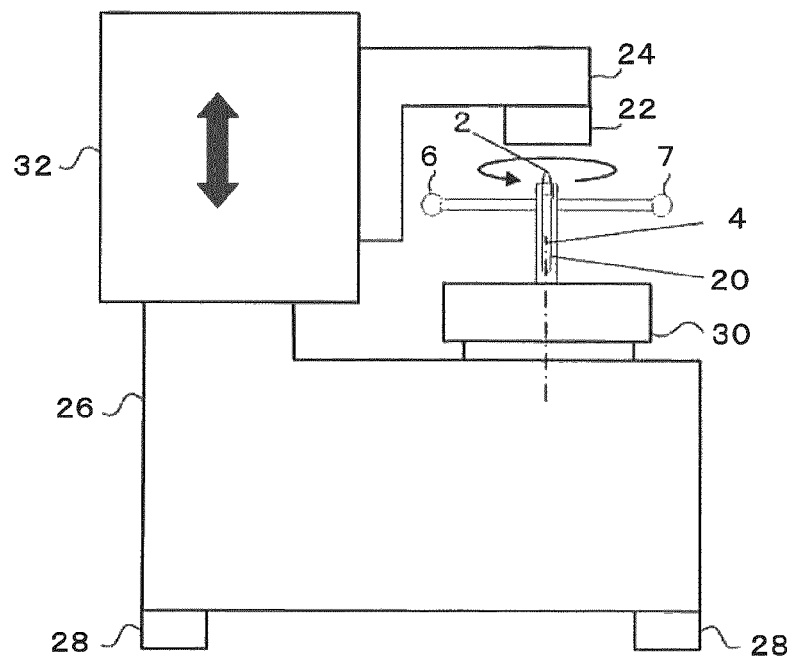
FIGS. 13A and 13B illustrate a machine tool according to the present invention.

FIG. 13A is a schematic side view of the machine tool according to the present invention. The tool holder 20 is mounted on the center of a spindle 30, and depth-of-cut control is performed by vertically moving a workpiece 22 along a Z-axis. The direction of the rotary axis of the spindle 30 is adjusted to the gravitational direction. This is done because the tool holder 20 is structurally susceptible to the force of gravity. A heavy object, such as a balance weight, is attached to the tool holder 20. The force of gravity does not affect the beam displacement, since it is constantly oriented relative to the balance weight without regard to the rotational phase as long as the balance weight rotates in a horizontal plane. If the balance weight rotates in a vertical plane, however, the force of gravity that acts on the balance weight directly influences the beam displacement, however, the rotation in the vertical plane is undesirable. The spindle 30 is equivalent to the turntable 12.

Preferably, the spindle should be motor-driven to ensure control with a precise rotational frequency, Further, the bearing for the spindle should preferably be an air bearing which allows the spindle to be smoothly driven even in the high-speed rotation mode and generates little heat. The cutting edge may be oriented upward or downward depending on the location of the spindle. For ease of discharge of swarf on the workpiece 22, however, the cutting edge of the tool 2 should preferably be oriented upward, as shown in FIG. 13A. Since swarf is liable to accumulate on the side of the tool holder 20, there may be a case where downward orientation of the tool edge is preferred, depending on the type of machining.

The position of the cutting edge of the tool 2 relative to the workpiece 22 depends on the rotational speed of the spindle 30 and the Z-axis position. Therefore, an arbitrary rotationally symmetrical shape is cut by continuously simultaneously controlling the spindle rotation speed and the Z-axis position. For high-precision machining, a single-crystal diamond tool should preferably be used as a cutting tool. Theoretically, the cutting operation may be performed by using a grinding stone in place of the cutting tool. Since only a small grinding stone can he mounted, however, it wears quickly.

Figure 13B:
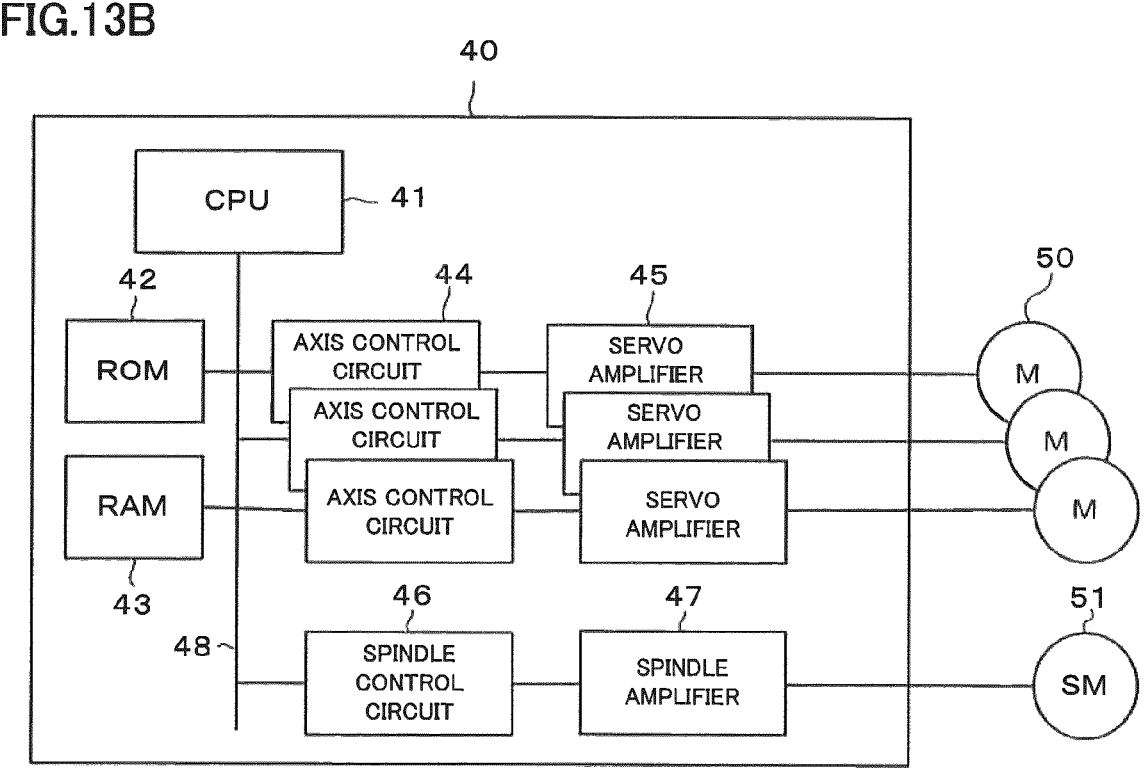

FIG. 13B is a schematic block diagram of a numerical controller 40 for controlling the machine tool. A CPU 41 is a processor for generally controlling the controller 40. The CPU 41 transmits to and receives signals from a ROM 42, a RAM 43, axis control circuits 44 for drivingly controlling servomotors for individual axes, a spindle control circuit 46 for drivingly controlling the spindle, etc., through a bus 48. The CPU 41 reads a system program from the ROM 42 through the bus 48 and controls the entire numerical controller in accordance with the read system program.

On receiving move command values for the respective axes from the CPU 41 and position/speed feedback signals from position/speed detectors contained individually in servomotors 50 for the respective axes, the axis control circuits 44 perform position/speed feedback control and outputs commands for the respective axes to servo amplifiers 45. On receiving these commands, the servo amolifiers 45 drive the servomotors 50 for the respective axes (X-, Y-, and Z-axes) of the machine tool. An arrangement for position/speed feedback is not shown in FIG. 13B. The machine tool may be constructed as a five-axis machine tool by adding A- and B-axes to the X-, Y-, and Z-axes as linear axes.

On receiving a spindle rotation command from the CPU 41 and a speed feedback signal from a position detector (not shown) for detecting the rotational speed of the spindle 30, moreover, the spindle control circuit 46 performs speed feedback control and outputs a spindle rotation speed signal to a spindle amplifier 47. On receiving the spindle rotation speed signal, the spindle amplifier 47 causes the spindle motor 51 to rotate at a commanded speed.

Figure 14:
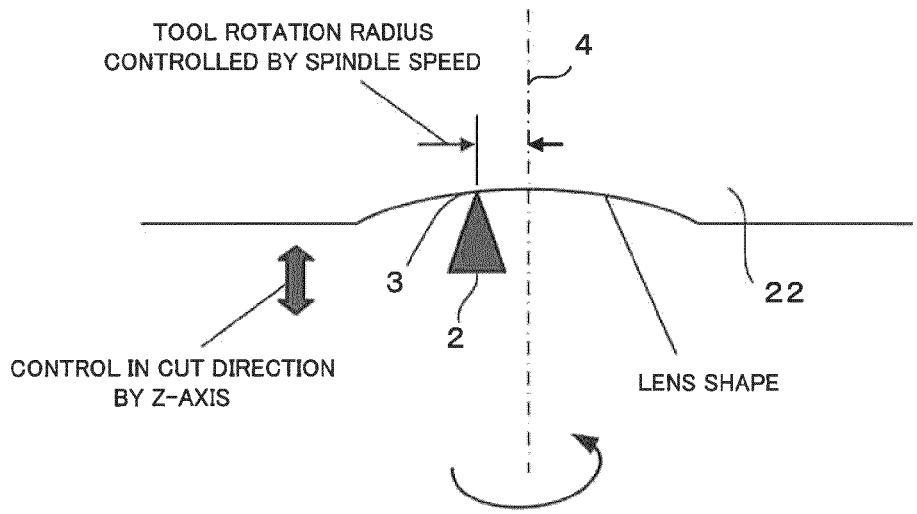
FIG. 14 illustrates control in a cut direction by means of a Z-axis.

FIG. 14 illustrates an example in which a concave lens shape is machined by using the machine tool according to the present invention shown in FIGS. 13A and 13B. The movement of the tool 2 relative to the workpiece 22 in the cut direction of the tool 2 is controlled by the Z-axis of the machine tool. Further, the tool rotation radius $R_t$ of the tool 2 is controlled at the rotational speed of the spindle 30. Although FIG. 14 shows the case where the concave lens shape is machined, a convex lens shape can also be machined by controlling the Z-axis and the spindle 30 of the machine tool.

In the case of the present invention, the motion of the tool 2 on the workpiece 22 is substantially the same as that of the prior art tool 2 shown in FIG. 27B. This spiral motion is realized by the rotational speed of the spindle only, and the tool is oriented in the machining direction, in principle. Accordingly, this is a very simple and convenient method having a great advantage in that the linear axes do not need to be driven at high speed at all.

Figure 15:
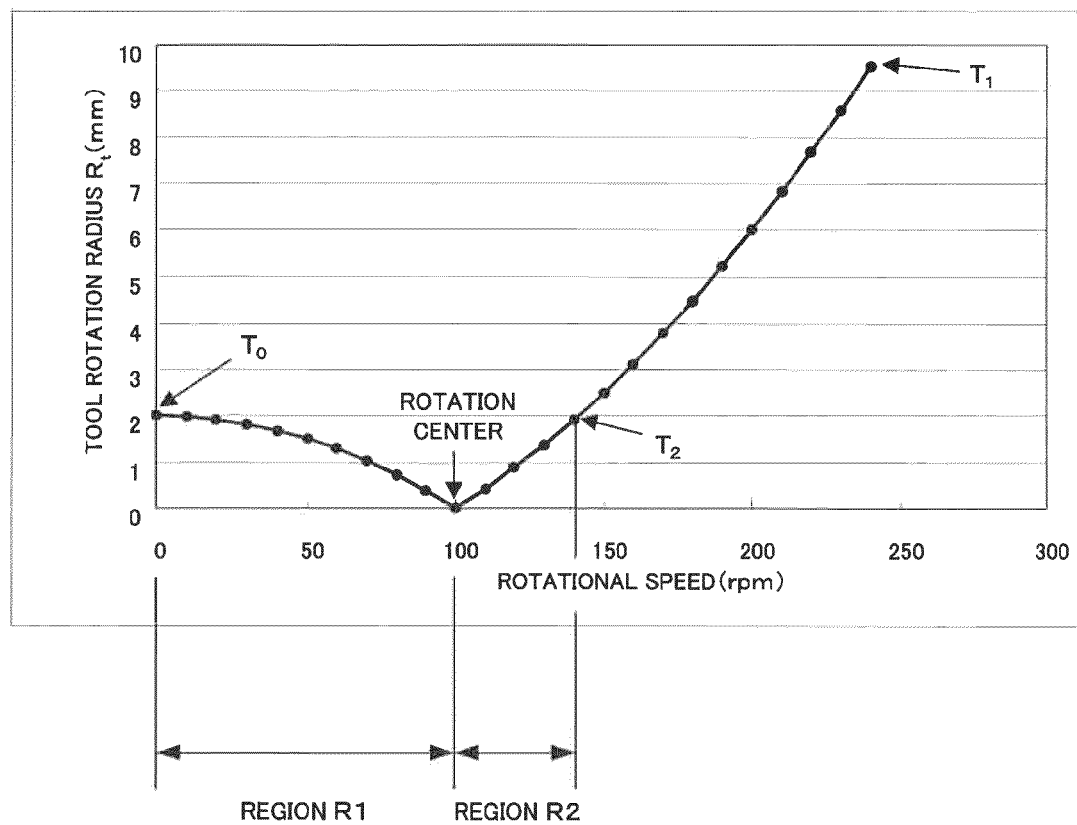
FIG. 15 is an example of a graph obtained by plotting relationships between a spindle rotation speed and a tool rotation radius.

FIG. 15 is an example of a graph obtained by plotting relationships between the spindle rotation speed and tool rotation radius. As described above in connection with the embodiment of FIG. 10, the rotation radius $R_t$ of the tool 2 involves the initial offset. $T_0$. The initial offset $T_0$ is about 2 mm in the graph of FIG. 15.

If regions with radii of 2 mm or less are to be machined, as shown in FIG. 15, two regions are selectable, a rotational speed region RI ranging from 0 to 100 rpm from $T_0$ to the rotation center) and a rotational speed region R2 ranging from 100 to 140 rpm from the rotation center to $T_2$, which is a tool edge position of a rotation radius equal to $T_0$).

Since a resolution allowing a rotational speed to be assigned is equivalent to a resolution allowing a tool rotation radius $R_t$ to be assigned, the tool rotation radius $R_t$ with higher resolution can be assigned to ensure more precise tool edge position control by using the lower rotational speed region R1 (from $T_0$ to the rotation center), as seen from FIG. 15.

Further, "cutting speed=tool rotation radius $R_t$×rotational speed" is given as a machining condition. Therefore, the cutting speed can be changed less by the difference in radius in the rotational speed region R1 where the tool rotation radius $R_t$ is reduced if the rotational speed is increased than in the rotational speed region R2 where the tool rotation radius $R_t$ increases if the rotational speed is increased. Thus, the lower rotational speed region R1 from $T_0$ to the rotation center can enjoy machining under more constant conditions.

Figure 16:
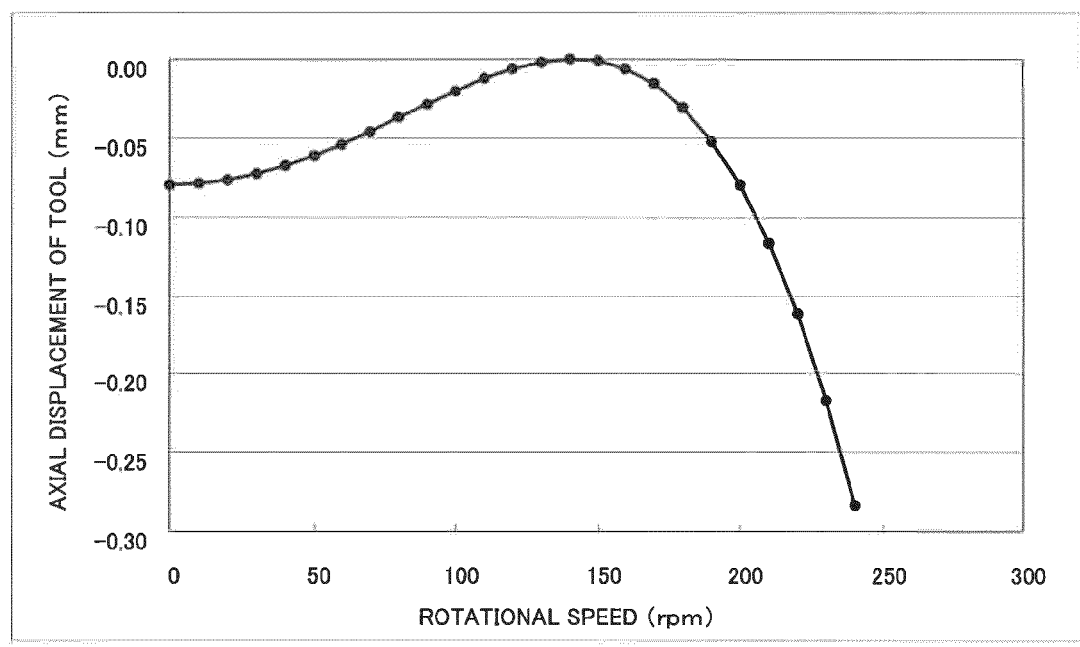
FIG. 16 is an example of a graph obtained by plotting relationships between the spindle rotation speed and an axial displacement of the tool.

FIG. 16 is an example of a graph obtained by plotting relationships between a rotational speed of the spindle and a displacement of the tool in the axial direction. Since one end of the tool is secured to one end of the beam, the other end of which is secured to the turntable, the motion of the tool edge is not straight (see FIGS. 11A to 11C and 12). The plots in the graph of FIG. 16 indicate that displacement of the tool in the axial direction (displacement of the tool in the workpiece cut direction) is maximum when the rotational speed of the tool is nearly 150 rpm. The variations in cut amounts according to the rotational speed needs to be corrected on a machining program.

A lens shape or the like is generally based on a cross-sectional shape formula, from which coordinates of the tool are derived for machining. In creating the machining program, an approximate formula is obtained from the graphs obtained by plotting the relationships between the spindle rotation speed and tool displacement, such as the ones shown in FIGS. 15 and 16. Based on the obtained approximate formula, a coordinate X (=tool rotation radius $R_t$) derived from the original shape formula is converted into a rotational speed V, and a correction $Z_c$ (=axial displacement of the tool) is added to a cut of depth Z of the tool. In this way, the machining program may be created with coordinates (X, Z) of the original shape formula represented by (V, Z+$Z_c$).

Figure 17:
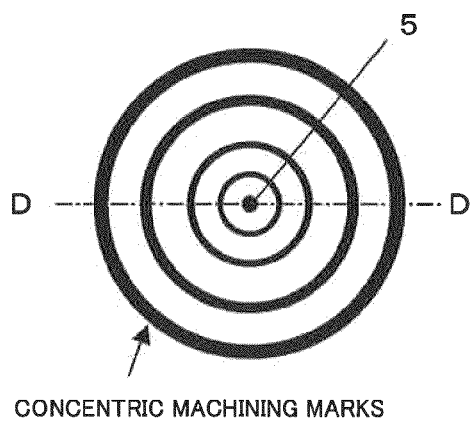
FIG. 17 is a diagram illustrating the relationships between the spindle rotation speed and tool rotation radius and a method for measuring the displacement of the tool along the axis of rotation of the tool with respect to the spindle rotation speed.

FIG. 17 is a diagram illustrating the relationships between the spindle rotation speed and tool rotation radius and a method for measuring the axial displacement of the tool with respect to the spindle rotation speed. The plot diagrams of FIGS. 15 and 16 can be easily created by performing trial machining on a flat workpiece and then measuring the workpiece. If the rotational frequency is changed in phases as the flat workpiece is given the same cut (the same motion of the axes of the machine tool) in every occasion, concentric machining marks are obtained, as shown in FIG. 17.

Figure 18:
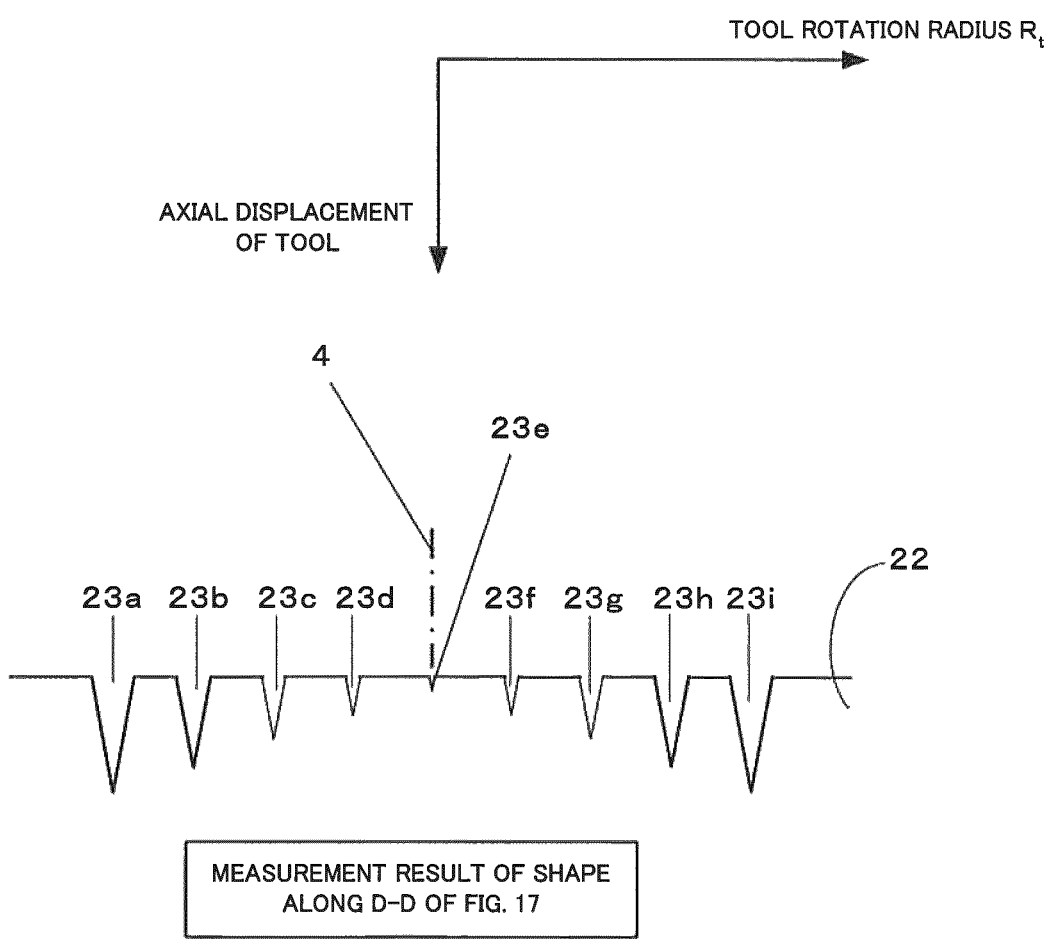
FIG. 18 is a diagram illustrating how the positions and depths of the respective bottoms of the grooves correspond to the tool rotation radius and the axial displacement of the tool at each rotational speed.

FIG. 18 is a diagram illustrating how the positions and depths of the respective bottoms of the grooves correspond to the tool rotation radius and the axial displacement of the tool at each rotational speed. If the shape of the workpiece along center line D-D of FIG. 17 is measured by means of a three-dimensional measuring device or the like, the grooves symmetrical with respect to the rotation center axis 4 can be measured. In FIG. 18, a groove 23a corresponds to a groove 23i; 23b to 23h, 23c to 23g, and 23d to 23f. As a result of this measurement, the positions and depths of the respective bottoms of the grooves correspond to the tool rotation radius and the axial displacement of the tool at each rotational speed.

Figure 19A:
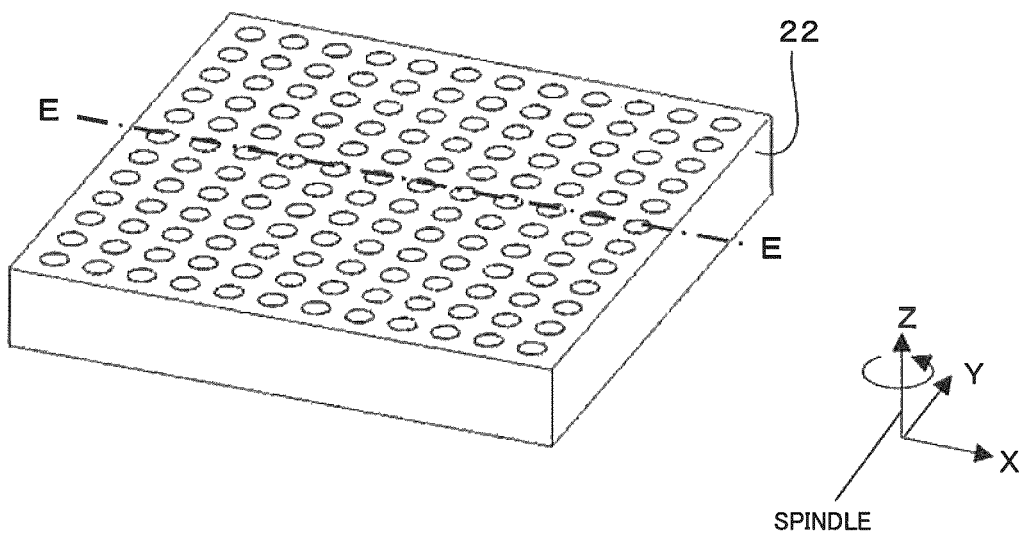
FIGS. 19A and 19B are views illustrating an example in which a plurality of lens-array shapes are machined on a flat workpiece by a machining method according to the present invention.
Figure 19B:
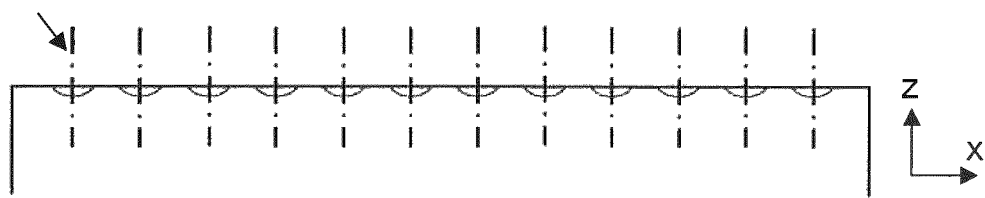

FIGS. 19A and 19B, are views illustrating an example in which a plurality of lens-array shapes are machined on a flat workpiece 22 by one embodiment of a machining method according to the present invention.

A machine tool that performs this machining is provided with the X-, Y-, and Z-axes as the linear axes, and the spindle is mounted along the Z-axis. After the workpiece 22 is positioned by means of the X- and Y-axes, each lens shape is machined by simultaneously controlling the cut by means of the Z-axis and the spindle rotation speed According to this method, the machining time for each lens shape can be equalized to the time for lathe turning, and the distances between the lenses can be accurately determined. Thus, the lens-array shapes can be machined quickly and precisely.

According to this machining method, moreover, the axes other than the spindle do not need to be rapidly driven, If the tool holder 20 can be mounted on the spindle 30, therefore, a conventional machine tool can be easily adapted to high-speed, high-precision machining of lens-array shapes.

Figure 20A:
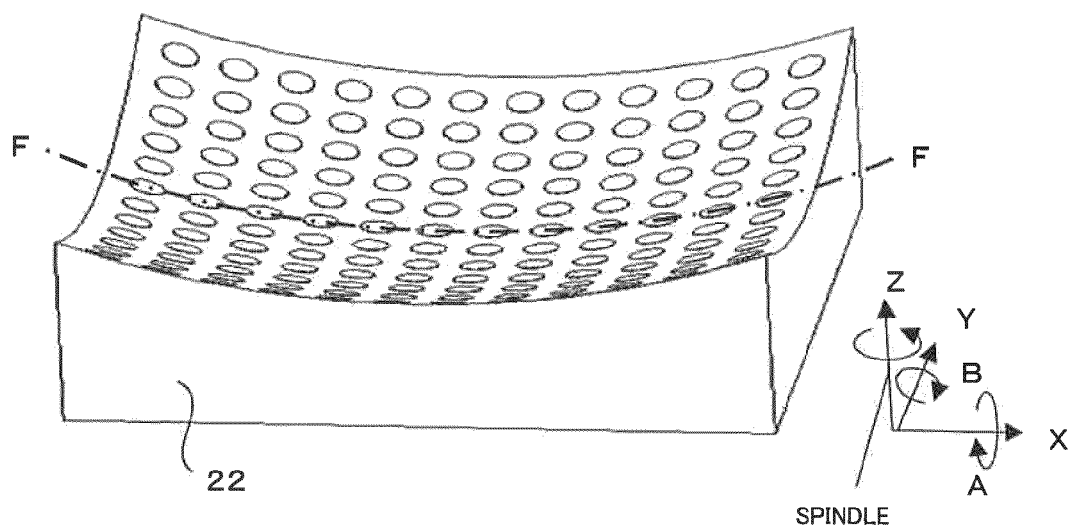
FIGS. 20A and 20B are views illustrating an example in which a plurality of lens-array shapes are machined on a curved workpiece by the machining method of the present invention.
Figure 20B:
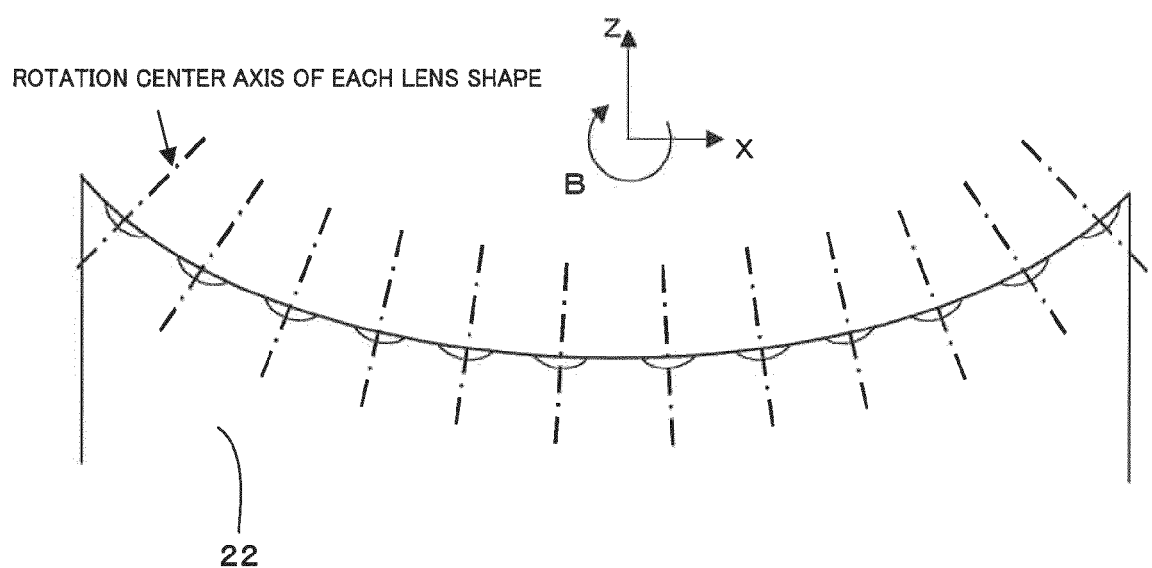

FIGS. 20A and 20B are views illustrating an example in which a plurality of lens-array shapes are machined on a curved workpiece 22 by one embodiment of the machining method according to the present invention.

A machine tool that performs this machining is a five-axis machine tool provided with A- and B-axes as rotary axes in addition to the X-, Y-, and Z-axes as the linear axes, and the spindle is mounted along the Z-axis. This machine tool, thus furnished with the two rotary axes (A- and B-axes), can arbitrarily change the posture of the tool 2 or the workpiece 22. As shown in FIGS. 20A and 20B, the rotation center axis of each lens shape never fails to be directed normal to the curved surface of the workpiece to be machined.

Figure 21A:
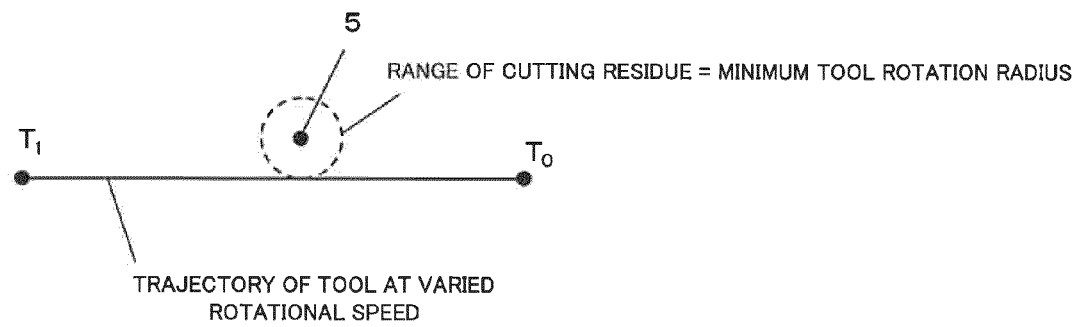
FIGS. 21A and 21B are diagrams for explaining that it is important for a tool edge to depict a trajectory that never fails to pass through the rotation center axis as lens shapes are machined.
Figure 21B:
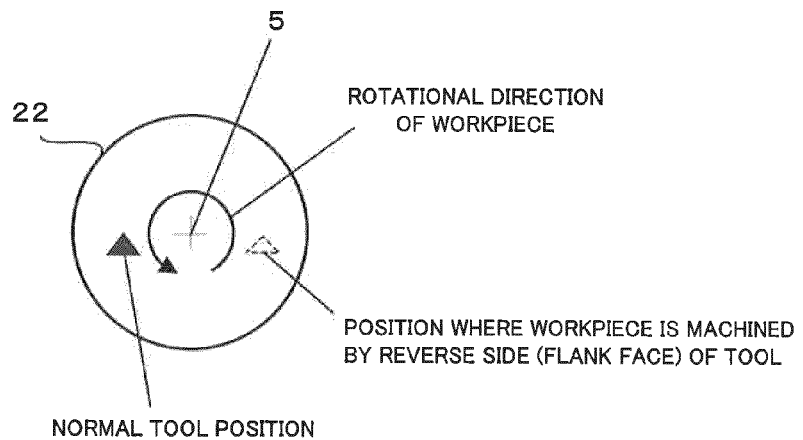

FIGS. 21A and 21B are diagrams illustrating the importance for the tool edge to depict a trajectory that never fails to pass through the rotation center axis as lens shapes are machined. As described above with reference to FIG. 10, the tool edge needs certainly to pass through the rotation center axis when the rotational speed is changed.

In the case where a lens shape is machined by the machining method of the present invention, the tool rotation radius $R_t$ is not zero if the tool edge does not pass through the rotation center, so that cutting residue is formed. This problem also occurs when a lens shape is machined by means of a conventional lathe. The machining method of the present invention also requires an operation for precisely adjusting the position of the tool edge to the rotation center.

Also in the machining method of the present invention, the mounting position is manually finely adjusted to achieve precise tool mounting. Since this manual fine adjustment of the mounting position cannot always be completed at a stroke, a simpler and more convenient method is desired. In the machining using the lathe, as shown in FIG. 21B, the reverse side (flank face) of the tool 2 inevitably contacts the rotating workpiece 22 depending on the positional relationship.

Figure 22:
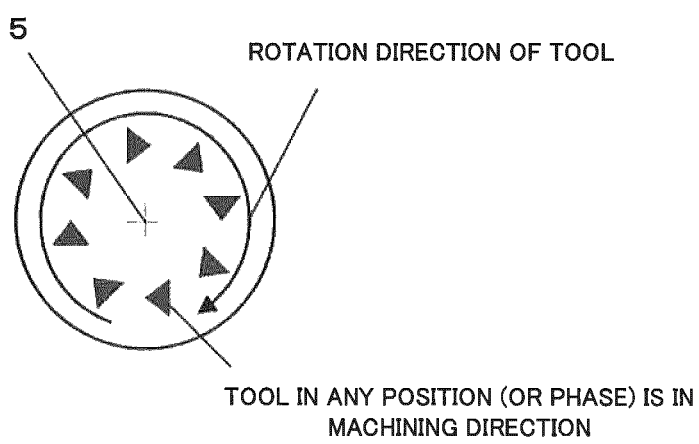
FIG. 22 illustrates the machining method of the present invention in which a flank face never contacts the workpiece without regard to the position (rotational phase) of the tool.

In the machining using the tool holder 20 of the present invention, on the other hand, the tool 2 never fails to be oriented in alignment with the machining direction, as shown in FIG. 22. Therefore, the flank face never contacts the workpiece without regard to the position (rotational phase) of the tool 2. Cutting residue can he easily removed by means of this feature.

Figure 23A:
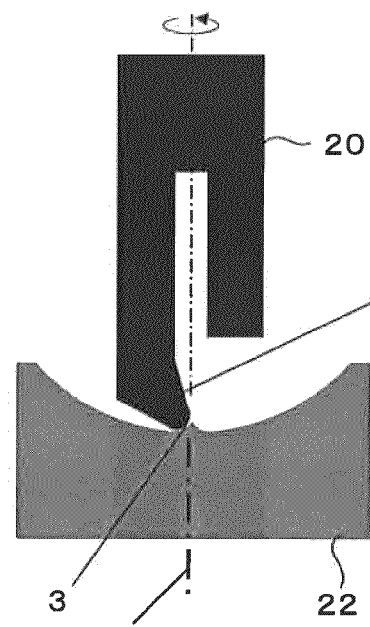
FIGS. 23A to 23C are views illustrating a method for removing cutting residue in the center of a lens shape.
Figure 23B:
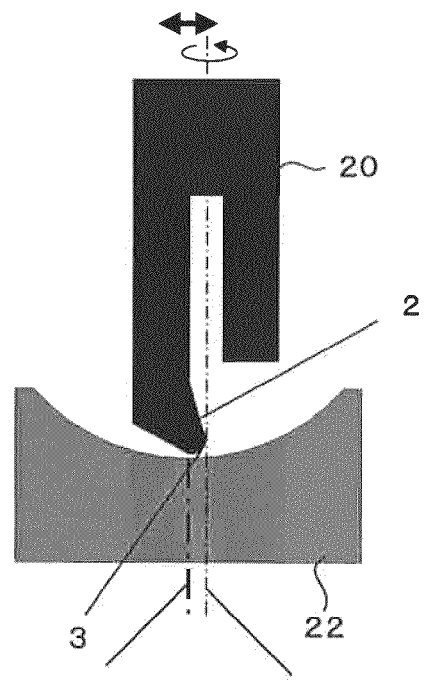
Figure 23C:
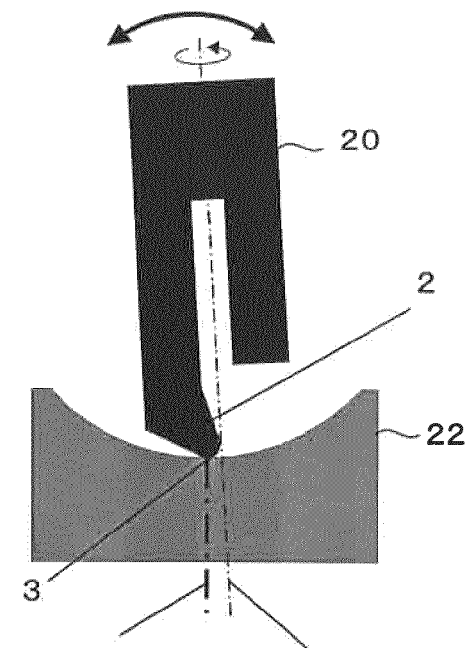

FIGS. 23A to 23C are views illustrating a method for removing cutting residue in the center of a lens shape. FIG. 23A shows the cutting residue formed at the central portion of the lens shape machined by the machining method of the present invention. In principle, the center of the lens shape to be machined is aligned with the rotation center axis of the tool.

FIG. 23B shows the next process for removing the cutting residue. The center position of the lens shape with respect to the rotation center axis of the tool 2 can be changed by moving the axes (in the X- and Y-axis directions in FIGS. 19A and 19B) of the machine tool. If the tool 2 is finely oscillated at a spindle rotation speed which makes the tool rotation radius $R_t$ minimum, at the central portion of the lens, then the cutting residue in the center can be removed in the manner shown in FIG. 23B. If the same process is performed by using the lathe, as shown in FIG. 21, there is certainly a moment when the flank face is engaged in the machining, so that the machined surface is roughened.

If the tool posture can be freely changed, as in the case of machining of curved workpiece shown in FIGS. 20A and 20B, however, a final error can be reduced by moving the tool along the lens shape, that is, by controlling the tool posture so that the tool rotation axis is normal to the curved surface, as shown in FIG. 23C.

The tool holder 20 according to the present invention is intended for the machining of a rotationally symmetrical shape, such as a lens shape, and an array including a number of such shapes. If the spindle rotation speed is made constant, the tool rotation radius $R_t$ is also constant, resulting in the same effect of conventional milling. Thus, a shape which can be machined by milling can also be machined by the machining method using the tool holder 20 of the present invention. As described above with reference to FIGS. 23A to 23C, moreover, a fine curved surface can also be machined if the tool posture is arbitrarily changed in a state where the tool rotation radius $R_t$ is small.

Figure 24:
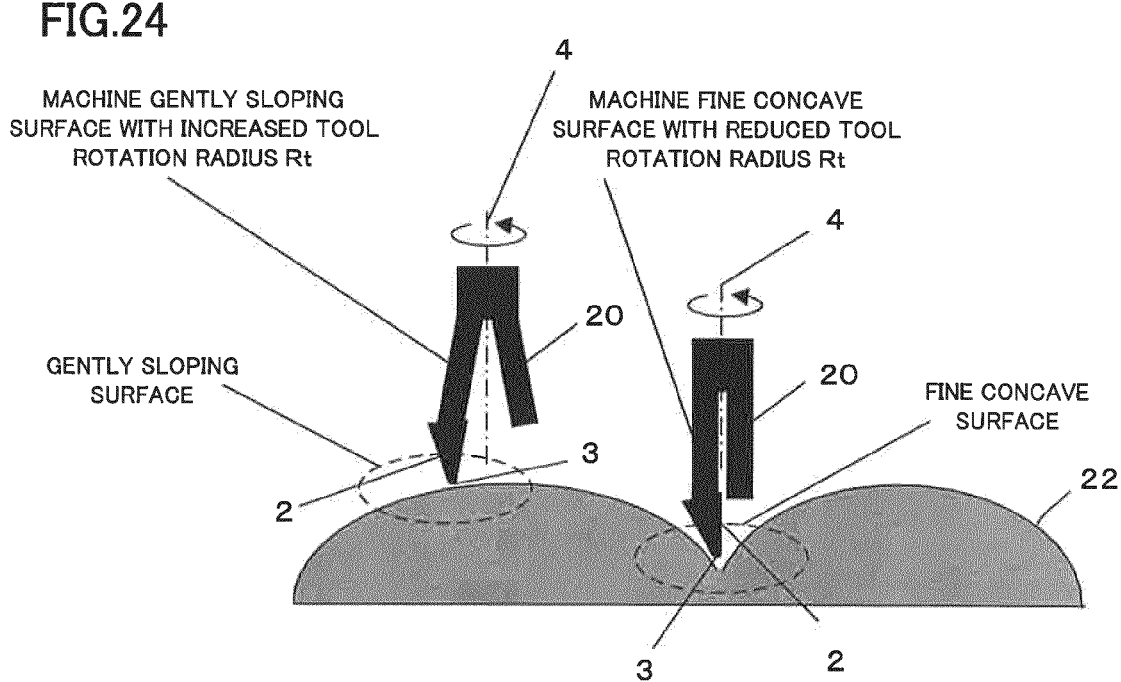
FIG. 24 is a view illustrating machining of a free curved surface with tool rotation radii varied.
Figure 25:
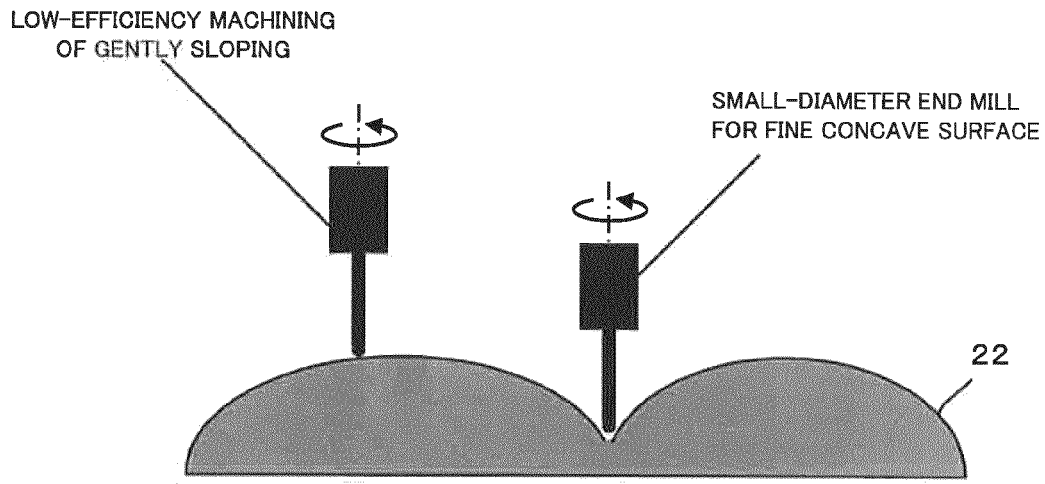
FIG. 25 is a view illustrating machining of a free curved surface using a conventional end mill.
Figure 28A:
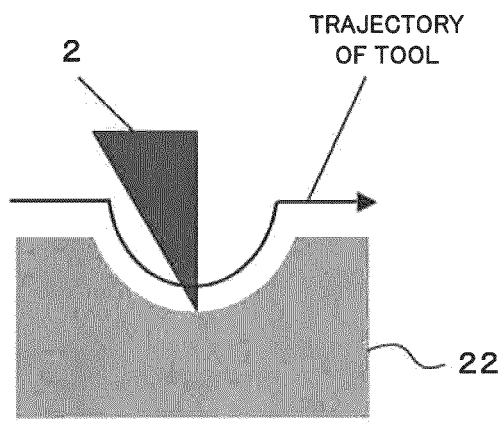
FIGS. 28A and 28B are views illustrating a machining method in which a workpiece is machined by a tool shaped after the cross-sectional shape of a lens.
Figure 28B:
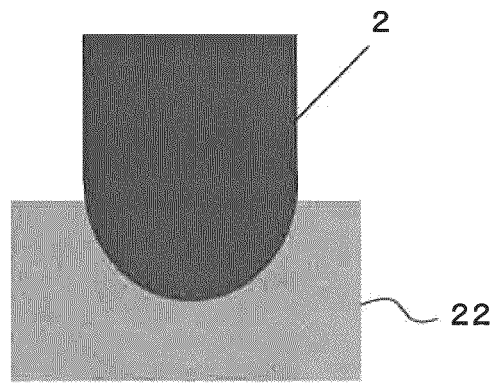
Figure 29:
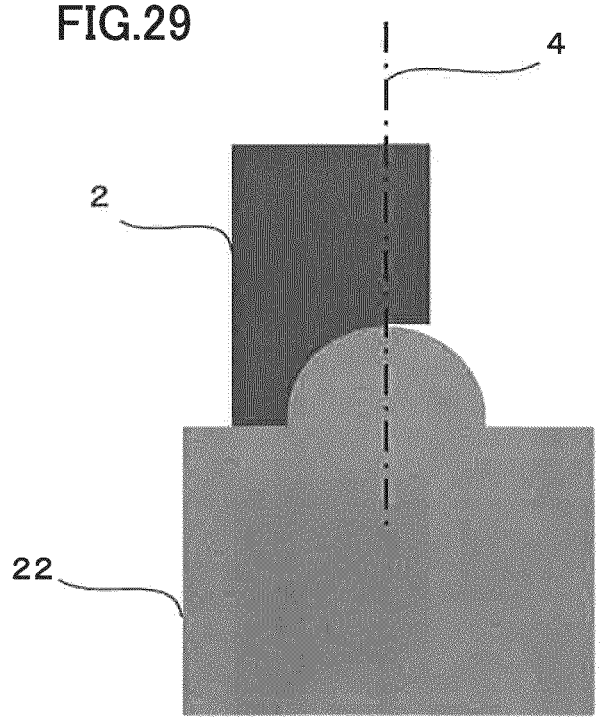
FIG. 29 is a view illustrating another machining method in which a workpiece is machined by a tool shaped after the cross-sectional shape of a lens.

FIG. 24 is a view illustrating machining of a free curved surface with tool rotation radii varied. According to the machining method of the present invention, the tool rotation radius can be changed according to the shape to be machined. Therefore, the machining efficiency can be improved by taking into consideration a case where tool rotation radii are required to be small and a case where tool rotation radii are not required to be so small. If machining can be achieved more quickly, the time during which the tool is in contact with the workpiece can be made shorter, so that wear of the tool can be prevented. Thus, the machining method of the present invention is effective for high-precision, high-efficiency machining of free curved surfaces, as well as for machining of lens-array shapes.

In machining a gently sloping surface, as shown in FIG. 24, the rotational speed of the tool 2 is increased so that the tool rotation radius $R_t$ increases. In machining a fine concave surface, in contrast, the rotational speed of the tool 2 is reduced so that the tool rotation radius $R_t$ is smaller.

What is claimed is:

1. A tool holder configured to secure a tool and mounted on a rotary shaft, in which the tool holder is constructed so that the tool is secured with a cutting edge of the tool directed to a rotation center axis of the rotary shaft, a structure of the tool holder is elastically deformed by a centrifugal force produced as the tool holder is rotated by driving the rotary shaft, and the radius of rotation of the cutting edge of the tool around the rotation center axis is variable, wherein the cutting edge of the tool secured to the tool holder on the rotary shaft as viewed along the rotation center axis, in a coordinate system in which the tool holder is viewed along the rotation center axis, is configured to be located in a first position deviated from the rotation center axis by an initial offset when the rotary shaft is stationary and located in a second position when the rotational speed of the rotary shaft is maximal, the rotation center axis is located on a segment which connects the first position and the second position, and the cutting edge of the tool moves from the first position to the second position passing through the rotation center axis when the stationary state of the rotary shaft is changed into a maximum rotational speed state, and wherein the structure of the tool holder comprises two beams elastically deformable to the same degree in opposite directions by the centrifugal force, and centrifugal force components acting on the two beams cancel each other so that a rotation balance is maintained even when the rotational speed of the tool holder is changed.

2. The tool holder according to claim 1, wherein the two beams of the tool holder are connected individually to two balance weights in positions with rotation radii larger than that of the tool holder, and elastic deformation of the tool holder is increased by means of the centrifugal force acting on the balance weights during rotation.

3. The tool holder according to claim 1, wherein one of the two beams of the tool holder is configured to be fitted with the tool, and the structure of the tool holder is configured to be fitted with a balance weight for adjusting the rotation balance of the entire tool holder, including a change produced by the mass of the mounted tool.

4. The tool holder according to claim 1, wherein the structure of the tool holder comprises two beams elastically deformable in opposite directions by the centrifugal force, each of the beams being in the form of a parallel spring such that an angle of an end face of the beam is kept constant relative to the axis of rotation when the beam is elastically deformed by the centrifugal force.

5. A machine tool comprising the tool holder according to claim 1 mounted on a spindle, the axial direction of which is coincident with a gravitational direction, and said machine tool comprising an axis movable as a linear axis in at least the axial direction of the spindle, wherein an arbitrary rotationally symmetrical shape is cut by controlling the rotational speed of the spindle and the position of the linear axis.

6. A machining method using the machine tool according to claim 5, comprising:

previously measuring the tool rotation radius with respect to the rotational speed of the spindle and a displacement of the tool along the axis of rotation with respect to the rotational speed of the spindle;

converting the radius of a rotationally symmetrical shape to be machined by the machine tool into the rotational speed of the spindle according to point group data for the radius and height or a shape formula;

converting the height into a displacement of the linear axis corrected by the displacement along the axis; and then creating a machining program.

7. A machining method for a lens-array shape, comprising machining a number of said rotationally symmetrical shapes in arbitrary positions on a flat or curved surface of a workpiece to be machined by controlling the position and posture of the tool holder by means of the linear axis or rotary axis of the machine tool by the machining method according to claim 6.

8. A tool holder for securing a tool and configured to be mounted on a rotary shaft, the tool including a tip as a cutting edge substantially at a rotation center axis of the rotary shaft when the rotary shat is stationary, a structure of the tool holder being elastically deformable by a centrifugal force when the rotary shaft is rotated at a non-zero speed, the tool holder comprising:

a rotation table;

a first elastic member having a first end and a second end, the first end of the first elastic member being coupled to a first side the rotation table;

a second elastic member having a first end and a second end, the first end of the second elastic member being coupled to a second side of the rotation table; and a weight coupled to the second end of the first elastic member, wherein the tool is configured to be coupled between the weight and the second end of the second elastic member, such that a longitudinal axis of the tool is substantially coaxial with the rotation center axis of the rotary shaft.

\* \* \* \* \*